United States Patent
Siomina et al.

(10) Patent No.: US 9,374,662 B2
(45) Date of Patent: Jun. 21, 2016

(54) ENHANCING POSITIONING IN MULTI-PLMN DEPLOYMENTS

(71) Applicant: TELEFONAKTIEBOLAGET L M ERICSSON (PUBL), Stockholm (SE)

(72) Inventors: Iana Siomina, Solna (SE); Yang Zhang, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 346 days.

(21) Appl. No.: 13/882,873

(22) PCT Filed: Mar. 13, 2013

(86) PCT No.: PCT/SE2013/050230
§ 371 (c)(1),
(2) Date: May 1, 2013

(87) PCT Pub. No.: WO2014/017965
PCT Pub. Date: Jan. 30, 2014

(65) Prior Publication Data
US 2014/0073356 A1 Mar. 13, 2014

Related U.S. Application Data

(60) Provisional application No. 61/676,696, filed on Jul. 27, 2012.

(51) Int. Cl.
*H04W 4/02* (2009.01)
*H04W 64/00* (2009.01)
(Continued)

(52) U.S. Cl.
CPC ............... *H04W 4/02* (2013.01); *G01S 5/0205* (2013.01); *H04W 64/00* (2013.01); *H04W 16/14* (2013.01)

(58) Field of Classification Search
CPC ....... H04W 4/02; H04W 64/00; H04W 16/14; G01S 5/0205
See application file for complete search history.

(56) References Cited

U.S. PATENT DOCUMENTS 8,406,787 B2   3/2013   Kangas et al.
2002/0094824 A1   7/2002   Kennedy, Jr. et al.
(Continued)

FOREIGN PATENT DOCUMENTS

WO   2010/069610 A1   6/2010
WO   2011/136711 A1   11/2011

OTHER PUBLICATIONS

3GPP TS 23.251 V11.1.0; 3rd Generation Partnership Project, Technical Specification Group Services and System Aspects, Network Sharing, Architecture and functional description (Release 11), Mar. 2012 (28 pages).
(Continued)

*Primary Examiner* — Marcos Torres
(74) *Attorney, Agent, or Firm* — Patent Portfolio Builders, PLLC

(57) ABSTRACT

Network sharing allows different core network operators to connect to a shared radio access network. The operators may share the radio network elements, and may also share the radio resources themselves. Examples of radio access sharing architectures include GWCN and MOCN. In such multi-PLMN deployment scenarios, operators are also interested in sharing measuring nodes due to their expense. To enable sharing, method(s), apparatus(es), and/or system(s) are proposed in which network nodes may perform joint selection of positioning nodes and PLMNs; in which positioning nodes of different PLMNs may communicate; in which a positioning node may obtain and use assistance data associated with a PLMN different from that of the positioning node; and to coordinate positioning measurement.

21 Claims, 14 Drawing Sheets

(51) Int. Cl.
*G01S 5/02* (2010.01)
*H04W 16/14* (2009.01)

(56) References Cited

U.S. PATENT DOCUMENTS

| | | | |
|---|---|---|---|
| 2004/0132466 | A1 | 7/2004 | Kennedy, Jr. |
| 2006/0009236 | A1 | 1/2006 | Bose et al. |
| 2008/0026733 | A1 | 1/2008 | Jaatinen |
| 2010/0120435 | A1* | 5/2010 | Mia .................... H04W 64/003 455/440 |
| 2012/0052875 | A1 | 3/2012 | Kangas et al. |
| 2013/0040673 | A1 | 2/2013 | Siomina et al. |

OTHER PUBLICATIONS

3GPP TS 29.171 V9.2.0, 3rd Generation Partnership Project, Technical Specification Group Core Network and Terminals, Location Services (LCS), LCS Application Protocol (LCS-AP) between the Mobile Management Entity (MME) and Evolved Serving Mobile Location Centre (E-SMLC), SLs interface (Release 9), Sep. 2010 (51 pages).

3GPP TS 36.355 V9.1.0, 3rd Generation Partnership Project, Technical Specification Group Radio Access Network, Evolved Universal Terrestrial Radio Access (E-UTRA), LTE Positioning Protocol (LPP) (Release 9), Mar. 2010 (111 pages).

UserPlane Location Protocol, Candidate Version 2.0, May 27, 2011, Open Mobile Alliance OMA-TS-ULP-V2_0-20110527-C (410 pages).

3GPP TS 36.355 V10.4.0, 3rd Generation Partnership Project, Technical Specification Group Radio Access Network, Evolved Universal Terrestrial Radio Access (E-UTRA), LTE Positioning Protocol (LPP) (Release 10), Dec. 2011 (116 pages).

3GPP TS 29.171 V10.3.0, 3rd Generation Partnership Project, Technical Specification Group Core Network and Terminals, Location Services (LCS), LCS Application Protocol (LCS-AP) between the Mobile Management Entity (MME) and Evolved Serving Mobile Location Centre (E-SMLC), SLs interface (Release 10), Jun. 2011 (51 pages).

Inventor: Iana Siomina et al., U.S. Appl. No. 13/882,849, entitled "Obtaining and Using Composite Measurements for Positioning", filed May 1, 2013.

International Search Report and Written Opinion w/transmittal dated Feb. 6, 2014 in International Application No. PCT/SE2013/050334 (18 pages total).

International Search Report and Written Opinion w/transmittal dated Feb. 21, 2014 in International Application No. PCT/SE2013/050230 (22 pages total).

3GPP TS 23.271 V10.2.0, 3rd Generation Partnership Project, Technical Specification Group Services and System Aspects, Functional stage 2 description of Location Services (LCS) (Release 10), Mar. 28, 2011 (169 pages).

3GPP TS 36.305 V11.0.0, 3rd Generation Partnership Project, Technical Specification Group Radio Access Network, Evolved Universal Terrestrial Radio Access Network (E-UTRAN), Stage 2 functional specification of User Equipment (UE) positioning in E-UTRAN(Release 11 ), Jul. 2, 2012 (56 pages).

3GPP TS 36.355 V10.5.0, 3rd Generation Partnership Project, Technical Specification Group Radio Access Network, Evolved Universal Terrestrial Radio Access (E-UTRA), LTE Positioning Protocol (LPP) (Release 10), Jul. 2, 2012 (116 pages).

3GPP TS 29.171 V11.1.0, 3rd Generation Partnership Project, Technical Specification Group Core Network and Terminals, Location Services (LCS), LCS Application Protocol (LCS-AP) between the Mobile Management Entity (MME) and Evolved Serving Mobile Location Centre (E-SMLC), SLs interface (Release 11 ), Mar. 22, 2012 (51 pages).

3GPP TS 36.401 V10.4.0, 3rd Generation Partnership Project, Technical Specification Group Radio Access Network, Evolved Universal Terrestrial Radio Access Network (E-UTRAN), Architecture description (Release 10), Jul. 2, 2012 (20 pages).

3GPP TSG-RAN WG2 Meeting #78, R2-122116, Prague, Czech Republic, May 21-25, 2012, Change Request (20 pages).

\* cited by examiner

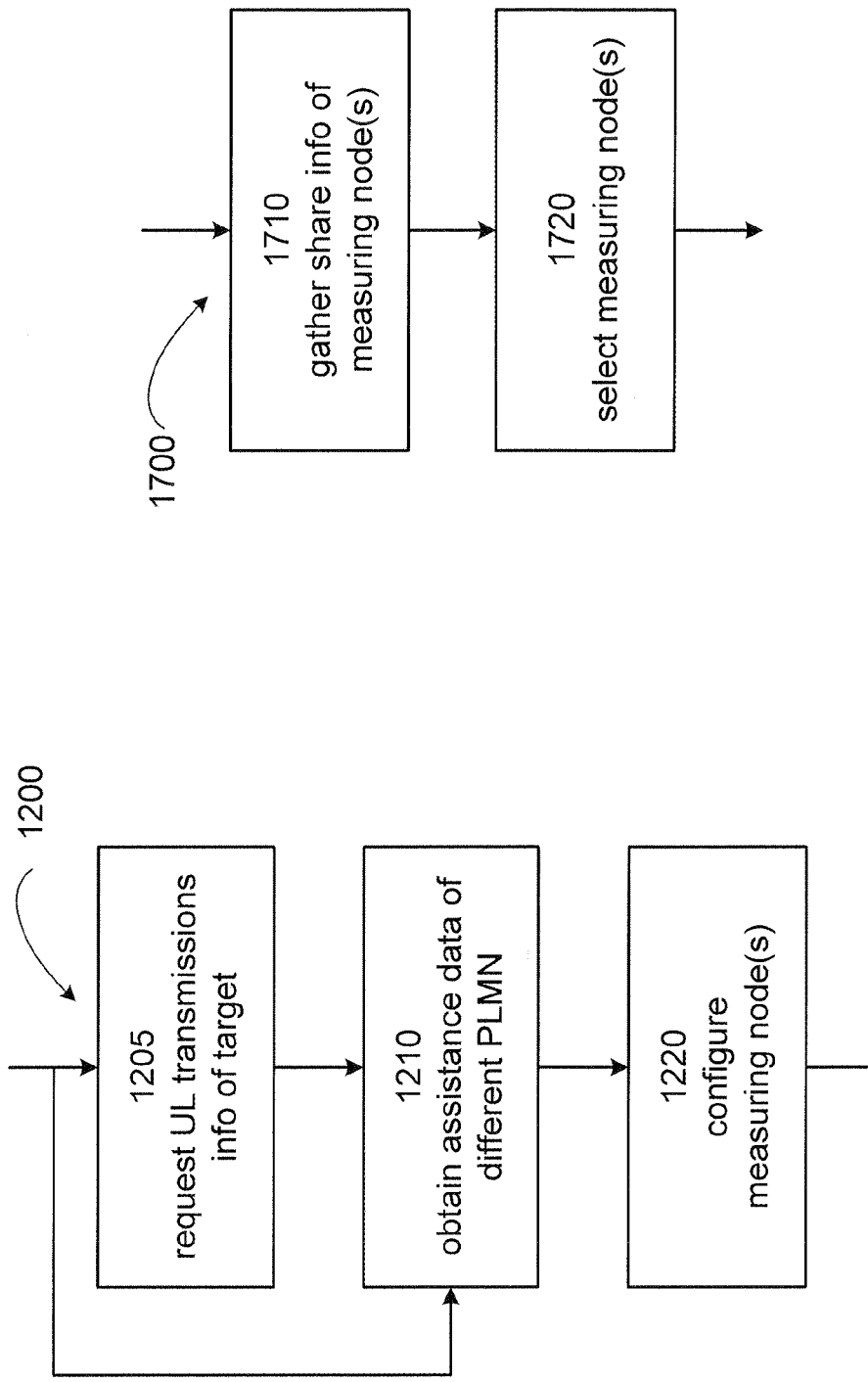

ENHANCING POSITIONING IN MULTI-PLMN DEPLOYMENTS

This application is the U.S. national phase of International Application No. PCT/SE2013/050230 filed 13 Mar. 2013 which designated the U.S. and claims priority to U.S. Provisional Application No. 61/676,696 filed 27 Jul. 2012, this application also may be related, at least in part, to U.S. patent application Ser. No. 13/882,849 entitled "OBTAINING AND USING COMPOSITE MEASUREMENTS FOR POSITIONING" filed May 1, 2013, the entire contents of each of which are hereby incorporated by reference.

TECHNICAL FIELD

The technical field of the present disclosure generally relates to wireless communications networks and in particular to enhancing positioning in multi-operator or multi-PLMN deployments.

BACKGROUND

The possibility to determine the position of a mobile device has enabled application developers and wireless network operators to provide location based and location aware services. Examples of such services include guiding systems, shopping assistance, friend finder, presence services, community and communication services and other information services giving the mobile user information about their surroundings.

In addition to the commercial services, governments in several countries have put requirements on the network operators to be able to determine the position of an emergency call. For instance, governmental requirements in the USA (FCC E911) specify that it must be possible to determine the position of a certain percentage of all emergency calls. The requirements do not differentiate between indoor and outdoor environment.

In many environments, the position can be accurately estimated by using positioning methods based on Global Positioning System (GPS). However, GPS-based positioning often have unsatisfactory performance in some areas such as urban or indoor environments. Complementary positioning methods could thus be provided by a wireless network. In addition to UE-based GNSS (including GPS), the following methods are available in the LTE standard for both the control plane and the user plane:

Cell ID (CID);
E-CID, including network-based AoA;
A-GNSS (including A-GPS);
Observed Time Difference of Arrival (OTDOA);
UL Time Difference of Arrival (UTDOA)—being currently standardized.
TDOA-/TOA-Based Methods (e.g., OTDOA, UTDOA or GNSS/A-GNSS):

A typical format of the positioning result is an ellipsoid point with uncertainty circle/ellipse/ellipsoid which is the result of intersection of multiple hyperbolas/hyperbolic arcs (e.g., OTDOA) or circles/arcs (e.g., UTDOA, GNSS, or A-GNSS).

Hybrid Methods:

Since the hybrid technique involves a mix of any of the methods above, the position result can be any shape, but in many cases it is likely to be a polygon.

Cellular positioning methods rely on knowledge of anchor nodes' locations, e.g., eNodeB or beacon device locations for OTDOA, LMU antenna locations for UTDOA, eNodeB locations for E-CID. The anchor nodes' location may also be used to enhance AECID, hybrid positioning, etc.

Positioning Protocols and Architectures

The three key network elements in an LTE positioning architecture are the LCS (Location Services) Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e., the entities being positioned. LCS Clients may reside in a network node, external node, PSAP, UE, radio base station, etc., and they may also reside in the LCS targets themselves. An LCS Client (e.g., an external LCS Client) sends a request to LCS Server (e.g., positioning node) to obtain location information, and LCS Server processes and serves the received requests and sends the positioning result and optionally a velocity estimate to the LCS Client.

Position calculation can be conducted, for example, by a positioning server (e.g., E-SMLC or SLP in LTE) or UE. The latter corresponds to the UE-based positioning mode, whilst the former may be network-based positioning (calculation in a network node based on measurements collected from network nodes such as LMUs (Location Measurement Unit) or eNodeBs), UE-assisted positioning (calculation is in a positioning network node based on measurements received from UE), LMU-assisted (calculation is in a positioning network node based on measurements received from LMUs), etc.

FIG. 1a illustrates the UTDOA architecture being currently discussed in 3GPP. Although UL measurements may in principle be performed by any radio network node (e.g., eNodeB), UL positioning architecture may include specific UL measurement units (e.g., LMUs) which e.g., may be logical and/or physical nodes, may be integrated with radio base stations or sharing some of the software or hardware equipment with radio base stations or may be completely standalone nodes with own equipment (including antennas). The architecture is not finalized yet, but there may be communication protocols between LMU and positioning node, and there may be some enhancements for LPPa or similar protocols to support UL positioning.

A new interface, SLm, between the E-SMLC and LMU is being standardized for UL positioning. The interface is terminated between a positioning server (E-SMLC) and LMU. It is used to transport SLmAP protocol (new protocol being specified for UL positioning) messages over the E-SMLC-to-LMU interface. Several LMU deployment options are possible. For example, an LMU may be a standalone physical node, it may be integrated into the eNodeB or it may be sharing at least some equipment such as antennas with the eNodeB—these three options are illustrated in the FIG. 1a.

LPPa (LPP annex) is a protocol between eNodeB and LCS Server specified only for control plane positioning procedures, although it still can assist user plane positioning by querying eNodeBs for information and eNodeB measurements. LPPa may be used for DL positioning and UL positioning.

In LTE, UTDOA measurements, UL RTOA, are performed on SRSs (Sounding Reference Signal). To detect an SRS signal, LMU needs a number of SRS parameters to generate the SRS sequence which is to be correlated to received signals. The SRS parameters used for generating the SRS sequence and determining when SRS transmissions occur may be provided in the assistance data transmitted by positioning node to LMU; these assistance data would be provided via SLmAP. However, these parameters may generally be not known to the positioning node, which needs then to obtain this information from eNodeB configuring the SRS to be transmitted by the UE and measured by LMU; this information would have to be provided in LPPa.

For DL positioning, LPP (LTE positioning protocol) has been standardized in LTE. LPP may be used over control plane or user plane connection (e.g., SUPL). LPP may also include elements-extensions such as LPPe (LPP extensions). FIG. 1b illustrates a DL positioning architecture.

LTE Positioning Protocol (LPP) is a positioning protocol for E-UTRAN control plane defined by 3GPP TS 36.355, the entire contents of which is hereby incorporated by reference. However, LPP has been designed in such a way that it can also be utilized outside the control plane domain such as in the user plane in the context of SUPL (Secure User Plane Location). LPP is currently used for DL positioning.

LPP elementary messages (Request and Provision of Capabilities and Location Information and Assistance Data) each include a container, an EPDU, which can be used by standardization for outside 3GPP to define their own extensions to LPP messages, or LPPe. OMA (Open Mobile Alliance) LPP Extensions take advantage of this option.

A variety of known and emerging positioning technologies are not in the scope of 3GPP work. This is natural because control plane deployments are typically bandwidth-constrained and limited to access types that are part of the control plane system. However, the user plane does not have any such limitations and, hence, new positioning technologies improving accuracy, availability and integrity can be realized in the user plane.

LPPe may be used, e.g., for operator-specific assistance data or assistance data that cannot be provided with LPP or to support other position reporting formats or new positioning methods. LPPe also reduces standardization work load and is applicable to both control and user plane.

A positioning result is a result of processing of obtained measurements, including Cell IDs, power levels, received signal strengths, etc., and it may be exchanged among nodes in one of the predefined formats. Positioning result may be based on measurements from more than one positioning methods. In 3GPP, the signaled positioning result is represented in a predefined format corresponding to one of the seven GAD shapes. Currently, the positioning result may be signaled between:

LCS target (e.g., UE) and LCS server, e.g., over LPP protocol;
Positioning servers (e.g., E-SMLC and SLP), over standardized or proprietary interfaces;
Positioning server and other network nodes (e.g., E-SMLC and MME/MSC/GMLC/086M/SON/MDT);
Positioning node and LCS Client (e.g., between E-SMLC and PSAP or between SLP and External LCS Client or between E-SMLC and UE).

In emergency positioning, LCS Client may reside in PSAPs.

Positioning result is often based on radio measurements (e.g., timing measurements such as timing advance and RTT or power-based measurements such as received signal strength) received from measuring radio nodes (e.g., UE or eNodeB or LMU).

In the uplink, measurements for UL positioning (e.g., UTDOA) are performed on UL transmissions, which may include, e.g., reference signal transmissions or data channel transmissions. UL Relative Time of Arrival (RTOA) is the currently standardized UTDOA timing measurement. The measurement may be performed on Sounding Reference Signals (SRS), which may be configured for periodic transmissions, typically comprising multiple transmissions but may also be a single transmission. SRS transmissions may be triggered by any of the two trigger types:

Trigger type 0: higher layer signaling from eNodeB;
Trigger type 1: via DL control channel signaling (DCI formats 0/4/1A for FDD and TDD and DCI formats 2B/2C for TDD).

In the current standard, user plane positioning is used for DL positioning, whilst control plane positioning may be used for DL positioning and UL positioning.

Secure User Plane Location (SUPL) is a positioning service/architecture defined by OMA (Open Mobile Alliance, a mobile communications industry forum that was created to bring open standards, platform independence, and global interoperability) over a user plane bearer, such as IP, to aid network and SUPL Enabled Terminal (SET) based positioning technologies in the calculation of a SET's position. An example OMA positioning architecture is illustrated in FIG. 2.

SUPL includes but is not limited to the definition of a Location User Plane (Lup) Reference Point and corresponding interface between the SUPL Location Platform (SLP) and SET, security functions (e.g., authentication, authorization), charging functions, roaming functions, and privacy functions. SUPL utilizes existing standards where available and possible, and SUPL should be extensible to enable more positioning technologies as the need arises, so that they can utilize the same mechanism. Since there is no signaling dependency on core network or radio access network, the basic positioning architecture is similar to control plane in essence but much simpler.

Example of a typical Network-Initiated positioning flow is illustrated in FIG. 3:

A. The SUPL agent issues an MLP SUR message to the H-SLP;
B. The H-SLP initiates a SUPL session with the SET by sending a ULP SUPL INIT message. The message contains requested positioning method;
C. When the ULP SUPL INIT is received by the SET, it establishes a secure connection to the H-SLP;
D. The SET then sends a ULP SUPL POS INIT message to start a positioning session with the H-SLP. The message contains the SET capabilities;
E. The H-SLP then determines the positioning method and exchanges several successive ULP SUPL POS messages, containing the used positioning protocol (i.e., RRLP, RRC, TIA-801), as needed to determine the position;
F. When the position calculation is complete, the H-SLP sends the ULP SUPL END message to the SET informing it that the SUPL session is finished. The SET then releases the secure connection to the H-SLP;
G. The H-SLP sends the position estimate back to the SUPL agent in an MLP SLIA message.

ULP can use other positioning protocols as payload including RRLP, LPP, TIA-801 etc. It can also convey on LPPe, which is an extension to LPP but defined and maintained by OMA.

In 3GPP, the user plane communication is via gateways (serving gateway, SGW, and PDN gateway, PGW) which are typically between the serving eNodeB and the SLP, and SUPL is between the UE (SET) and SLP. In a general user plane protocol stack, SUPL occupies the application layer with LPP transported as another layer above the SUPL. After establishing a TCP/IP connection (for a SET-initiated case) and initiating the SUPL and then LPP sessions, the flow of LPP messages (which may also contain LPPe) can be very similar to the control plane version of LPP (except for duplicate detection and retransmission as defined in 3GPP TS 36.355, since the MME (Mobility Management Entity) does not provide reliable and in-sequence delivery of LPP message), just with the SUPL Enabled Terminal (SET) as the LCS target and the SUPL Location Platform (SLP) as the LCS server.

Network Sharing

3GPP network sharing architecture allows different core network operators to connect to a shared radio access network. The operators may share the radio network elements, and may also share the radio resources themselves.

Network-sharing scenario allows operators without a UMTS/LTE license to share the network and supply its customers with 3 G/4 G services. For example, a 2 G operator may supply its subscribers with 3 G/4 G services using another operator's allocated spectrum.

Two architectures with radio access sharing exist. In the first architecture (aka Gateway Core Network (GWCN) configuration), MME is shared in addition to the radio access network (E-UTRAN) being shared. See FIG. 4a. In the second architecture (aka Multi-Operator Core Network (MOCN) configuration), which is an easier option, only the radio access network (E-UTRAN) is shared. See FIG. 4b. In both configurations, the UE behavior is same and no information concerning the configuration of a shared network is indicated to the UE. VLANs are used for traffic separation at eNodeB (one VLAN per operator).

S1-flex interface is to enable connection of each eNodeB to all EPC nodes within a pool area (TS 36.401: An MME pool area is defined as an area within which a UE may be served without having to change the serving MME. An MME pool area is served by one or more MMEs, aka "pool of MMEs", in parallel. MME pool areas are a collection of complete Tracking Areas. MME Pool Areas may overlap each other). In FIGS. 4a and 4b, the dashed cells (ovals) are the cells shared between the two operators and the dashed MME boxes are the shared MMEs. S1-flex is an equivalent of the Iu-flex 3 G/UMTS option.

If the E-UTRAN is shared by multiple operators, the system information broadcasted in each shared cell contains the PLMN ID of each operator (up to 6) and a single tracking area code (TAC) valid within all the PLMNs sharing the radio access network resources. Based on system broadcasts, the UE selects the desired PLMN and reports it to eNodeB during RRC connection setup. The eNodeB includes the selected PLMN in the INITIAL UE MESSAGE while sending it to the MME. The MME indicates the selected core network operator PLMN ID to the UE in the GUTI during initial attach procedure. Once attached to an MME, the UE shall be able to indicate the allocated MME in subsequent instances of the random access procedures. The indication of the allocated MME code, MMEC, is contained in the temporary UE identity.

Positioning node receives PLMN ID of the current cell of the target UE as a part of the Enhanced Cell Global Identity, ECGI, information, a mandatory field in LCS-AP as indicated in 3GPP TS 29.171.

LMUs are typically costly. Thus, UTDOA deployment can incur high capital expenditures. Therefore, operators are interested in LMU sharing, i.e., share LMU deployment across multiple PLMNs (Public Land Mobile Network). However, in standardization discussions (e.g., 3GPP RAN 2/3 discussions), it is not yet clear for multiple PLMN UTDOA deployment in LTE, how the nodes with positioning functionality (e.g., LMUs, E-SMLC, LMU gateway, coordinating node) should interwork with:

general-purpose network nodes, including radio network nodes, which may or may not be shared by the operators and/or may be operated by other operators than those operating the LMUs; and other logical/physical positioning nodes that belong to different PLMNs.

Also, there is as of yet no known techniques to select measuring nodes and coordinate positioning measurements in multi-PLMN scenarios, which may make it difficult for operators to achieve network sharing benefits for positioning.

SUMMARY

A non-limiting aspect of the disclosed subject matter is directed to a method performed by a network node for jointly selecting positioning node and PLMN. The method may include receiving a positioning-related request from a requesting node or an application. The positioning-related request may include any combination of a location request and a positioning data request. The location request may be a request for a location of a LCS target, and the positioning data request may be a request for data that may be used to determine the location of the LCS target. The method may also include selecting a PLMN and a positioning node of the selected PLMN in response to the positioning-related request. The method may further sending a positioning message to the selected positioning node, and receiving a positioning response message from the selected positioning node.

Another non-limiting aspect of the disclosed subject matter is directed to a computer readable medium which includes therein programming instructions executable by a computing device of a network node to perform the method of the network node as described above.

Another non-limiting aspect of the disclosed subject matter is directed to a network node structured to jointly select a positioning node and a PLMN for positioning. The network node may comprise a communicator, a network selector, and a positioning node selector. The communicator may be structured to receive a positioning-related request from a requesting node or an application. The network selector may be structured to select a PLMN in response to the positioning-related request. The positioning-related request may include any combination of a location request and a positioning data request. The location request may be a request for a location of a LCS target, and the positioning data request may be a request for data that may be used to determine the location of the LCS target. The positioning node selector may be structured to select a positioning node of the selected PLMN in response to the positioning-related request. The communicator may also be structured to send a positioning message to the selected positioning node, and to receive a positioning response message from the selected positioning node.

A non-limiting aspect of the disclosed subject matter is directed to a method performed by a first positioning node of a first PLMN. The method may comprise obtaining a positioning assistance data for UL positioning, the positioning assistance data being associated with a second PLMN (602), and configuring measurements in at least one measuring node. The assistance data comprises configuration information of signals and/or channels for measurements by the measuring node for UL positioning.

Another non-limiting aspect of the disclosed subject matter is directed to a computer readable medium which includes therein programming instructions executable by a computing device of a positioning node to perform the method of the positioning node as described above.

A non-limiting aspect of the disclosed subject matter is directed a first positioning node of a first PLMN. The first positioning node may comprise an assistance data manager structured to obtain a positioning assistance data for UL positioning, the positioning assistance data being associated with a second PLMN. The first positioning node may also comprise a configuration manager structured to configure measurements in at least one measuring node. The assistance data comprises configuration information of signals and/or channels for measurements by the measuring node for UL positioning.

Another non-limiting aspect of the disclosed subject matter is directed to a method performed by a coordinating node of a network to perform measurement coordination. The method may comprise gathering any one or more of a sharing capability, sharing capacity, and sharing configuration for each of one or more measuring nodes. The sharing capability may include information regarding the measuring node's capability to receive and/or process information from one more than one positioning nodes. The sharing capacity may include information regarding the measuring node's maximum number of statically and/or dynamically shared connections. The sharing configuration may include information regarding the measuring node's current number of shared connections. The method may also comprise selecting a set of measuring nodes for UL positioning based on the sharing capabilities, capacities, and configurations of the measuring nodes.

Another non-limiting aspect of the disclosed subject matter is directed to a computer readable medium which includes therein programming instructions executable by a computing device of a coordinating node to perform the method of the positioning node as described above.

Another non-limiting aspect of the disclosed subject matter is directed to a coordinating node structured to perform measurement coordination. The coordinating node may comprise an association manager structured to gather any one or more of a sharing capability, sharing capacity, and sharing configuration for each of one or more measuring nodes. The sharing capability may include information regarding the measuring node's capability to receive and/or process information from one more than one positioning nodes. The sharing capacity may include information regarding the measuring node's maximum number of statically and/or dynamically shared connections. The sharing configuration may include information regarding the measuring node's current number of shared connections. The coordinating node may also comprise a measuring node selector structured to select a set of measuring nodes for UL positioning based on the sharing capabilities, capacities, and configurations of the measuring nodes.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

FIG. 12 illustrates a flow chart of an example method performed by a positioning node to obtain and use assistance data associated with a different PLMN;

FIG. 17 illustrates a flow chart of an example method performed by a coordinating node to perform positioning measurement coordination;

DETAILED DESCRIPTION

Figure 1A:
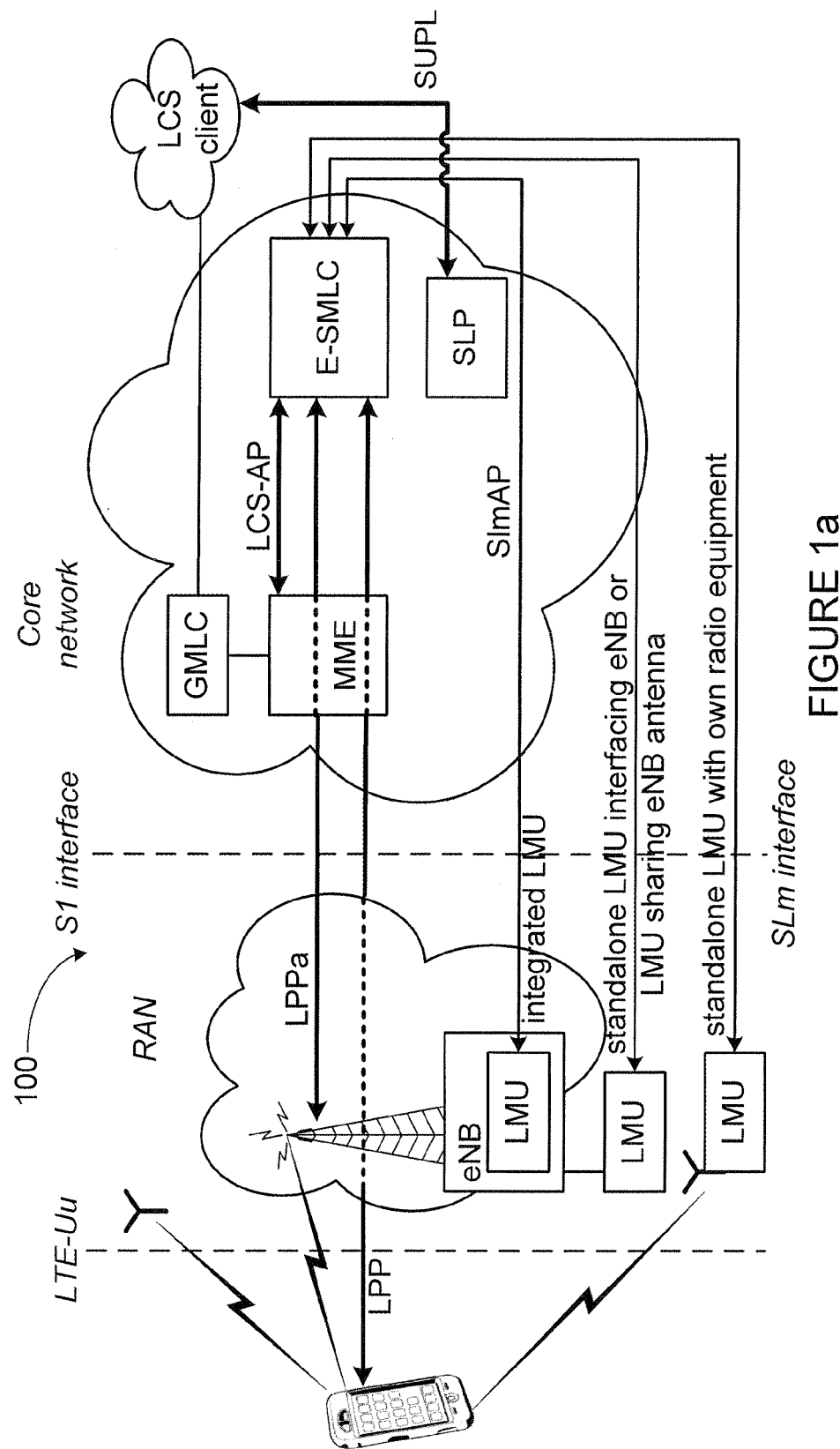
FIG. 1a illustrates an example of an uplink positioning architecture in LTE.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

Although terminologies from 3GPP are used in this disclosure for explanation purposes, this should not be seen as limiting the scope of the disclosed subject matter to only the aforementioned system. Other wireless systems, including WCDMA, WiMax, UMB, GSM and others may benefit from exploiting the ideas covered within this disclosure. Furthermore, the embodiments described herein may also apply in wireless networks supporting more than one radio access technology (RAT).

Figure 5C:
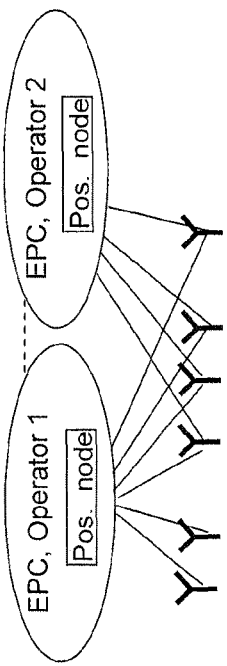
FIGS. 5a, 5b, 5c and 5d illustrates examples of multi-PLMN deployment scenarios.
Figure 5D:
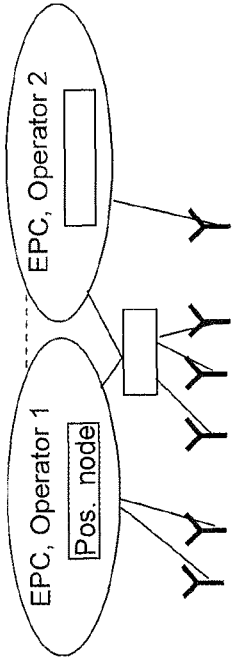
Figure 5A:
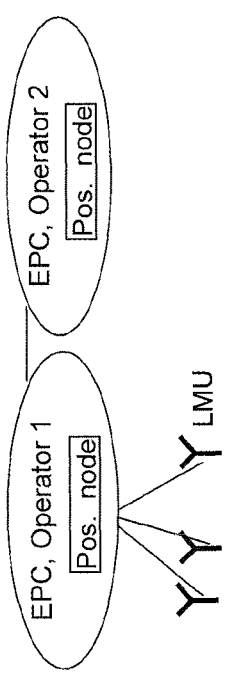
Figure 5B:
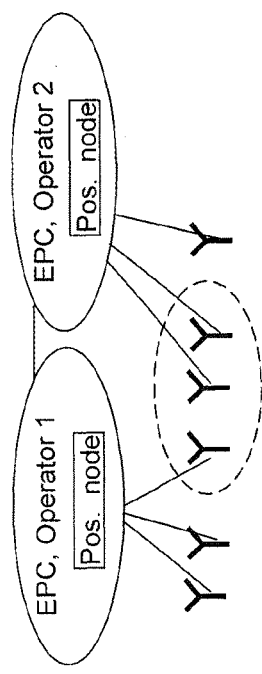

In the background section, it is indicated that due to high capital expenditures of UTDOA deployment, operators are interested in LMU sharing, i.e., share LMU deployment across multiple PLMNs (Public Land Mobile Network). However, it is not yet clear for multiple PLMN UTDOA deployment in LTE, how the nodes with positioning functionality should interwork with general-purpose network nodes and positioning nodes that belong to different PLMNS. Also, there is as of yet no known techniques to select measuring nodes and coordinate positioning measurements in multi-PLMN scenarios. Example multi-PLMN deployment scenarios, from the UL positioning perspective are illustrated in FIGS. 5a-5d:

FIG. 5a illustrates an example scenario in which one or more LMUs deployed in one PLMN;

FIG. 5b illustrates an example scenario in which multiple LMUs are deployed in multiple PLMNs. However, there is no sharing of any LMU between the PLMNs. Note that a single PLMN may not be sufficient for positioning;

FIG. 5c illustrates an example scenario in which multiple LMUs are deployed in multiple PLMNs, and one or more LMUs are shared between the PLMNs; and FIG. 5d illustrates an example scenario in which multiple LMUs are deployed in multiple PLMNs, and one or more LMUs are shared between the PLMNs via another node.

One or more non-limiting aspects of the disclosed subject matter address some or all of the issues described above with respect to the conventional solutions. In general, the inventive aspects may incorporate some or all of the following:

Methods (e.g., performed by a network node) for joint selection of PLMN and positioning node:
  Can apply to DL, UL, or hybrid positioning;
  Can apply to all scenarios, but may be particularly beneficial for scenarios 5a-5c;
Signaling between positioning nodes of different PLMNs:
  Can apply to DL, UL, or hybrid positioning;
  Can apply to all scenarios, but may be particularly beneficial for scenarios 5a-5b;
Methods of obtaining and using positioning assistance data associated with a PLMN different from that of the positioning node:
  Can apply to DL, UL, or hybrid positioning;
  Can apply to all scenarios, but may be particularly beneficial for scenarios 5b-5d;
Methods for positioning measurement coordination in multi-PLMN scenarios:
  Can apply to DL, UL, or hybrid positioning;
  Can apply to all scenarios, but may be particularly beneficial for the scenarios 5c-5d or even for scenarios 5a-5b when one positioning node communicates with LMUs via another positioning node.

The signaling described herein can be via direct links or logical links (e.g., via higher layer protocols and/or via one or more network nodes). For example, in LTE in the case of signaling between the E-SMLC and the LCS Client, the positioning result may be transferred via multiple nodes (at least via MME and/or GMLC).

Also, so as to contextualize the description, the following are provided. A radio node may be characterized by its ability to transmit and/or receive radio signals and it includes at least a transmitting or receiving antenna. Examples of radio nodes include a UE and a radio network node (see corresponding descriptions below).

In this description, wireless device and UE may be used interchangeably. A UE can be any device equipped with a radio interface and capable of at least transmitting to and/or receiving radio signals from another radio node. A UE may also be capable of receiving signal and demodulate it. Note that even some radio network nodes, e.g., femto BS (aka home BS), may also be equipped with a UE-like interface. Some examples of "UE" that are to be understood in a general sense are PDA, laptop, mobile, a tablet device, sensor, fixed relay, mobile relay, any radio network node equipped with a UE-like interface (e.g., small RBS, eNodeB, femto BS).

A radio network node can be a radio node included in a radio communications network. A radio network node may be capable of receiving and/or transmitting radio signals in one or more frequencies, and may operate in single-RAT, multi-RAT or multi-standard mode. A radio network node, including eNodeB, RRH, RRU, or transmitting-only/receiving-only radio network nodes, may or may not create own cell. Some examples of radio network nodes not creating own cell include beacon devices (which can transmit configured radio signals) and measuring nodes (which can receive and perform measurements on certain signals (e.g., location measurement units, LMUs)). Such radio network node may also share a cell or use the cell ID with another radio node which creates own cell, and/or it may operate in a cell sector or may be associated with a radio network node creating own cell.

More than one cell or cell sectors (commonly named in the described embodiments by a generalized term "cell" which may be understood as a cell or its logical or geographical part) may be associated with one radio network node. Further, one or more serving cells (in DL and/or UL) may be configured for a UE, e.g., in a carrier aggregation system where a UE may have one Primary Cell (PCell) and one or more Secondary Cells (SCells). A cell may also be a virtual cell (e.g., characterized by a cell ID but not provide a full cell-like service) associated with a transmit node.

A network node may be any radio network node (see the corresponding description) or core network node. Some non-limiting examples of a network node are an eNodeB (also radio network node), RNC, positioning node, MME, PSAP, SON node, MDT node, coordinating node, a gateway node (e.g., PGW or SGW or LMU gateway or femto gateway), and O&M node.

Positioning node described in different embodiments can be a node with positioning functionality. For example, for LTE it may be understood as a positioning platform in the user plane (e.g., SLP in LTE) or a positioning node in the control plane (e.g., E-SMLC in LTE). SLP may also consist of SLC and SPC, where SPC may also have a proprietary interface with E-SMLC. Positioning functionality may also be split among two or more nodes, e.g., there may be a gateway node between LMUs and E-SMLC, where the gateway node may be a radio base station or another network node; in this case, the term "positioning node" may relate to E-SMLC and the gateway node. In a testing environment, a positioning node may be a simulator or emulating test equipment.

The term "coordinating node" used herein can be a network node which coordinates radio resources with one or more radio nodes. Some examples of the coordinating node are network monitoring and configuration node, OSS node, O&M, MDT node, SON node, positioning node, MME, a gateway node such as Packet Data Network Gateway (PGW) or Serving Gateway (SGW) network node or femto gateway node, a macro node coordinating smaller radio nodes associated with it, eNodeB coordinating resources with other eNodeBs, etc.

The signaling described herein can be either via direct links or logical links (e.g., via higher layer protocols and/or via one or more network and/or radio nodes). For example, signaling from a coordinating node to a UE may also pass another network node, e.g., a radio network node.

The described embodiments are not limited to LTE, but may apply with any radio access network (RAN), single- or multi-RAT. Some other RAT examples are LTE-Advanced, UMTS, HSPA, GSM, cdma2000, WiMAX, and WiFi.

The term "subframe" used in the embodiments described herein (typically related to LTE) is an example resource in the time domain, and in general it may be any predefined time instance or time period.

Measuring node can be a radio node that performs positioning measurements, and can be a wireless device or a radio network node (e.g., LMU or eNodeB). Examples of positioning measurements, i.e., radio measurements used for positioning, include timing measurements (e.g., TDOA, TOA, timing advance, UE Rx-Tx, eNodeB Rx-Tx, RSTD defined for OTDOA, UL RTOA defined for UTDOA, etc.), angle measurements (e.g., AoA), received signal strength and received signal quality measurements. UL measurements are typically performed by a radio network node on signals/channels transmitted by one or more wireless devices. DL measurements are typically performed by a wireless device on signals/channels transmitted by one or more radio network nodes.

Figure 6:
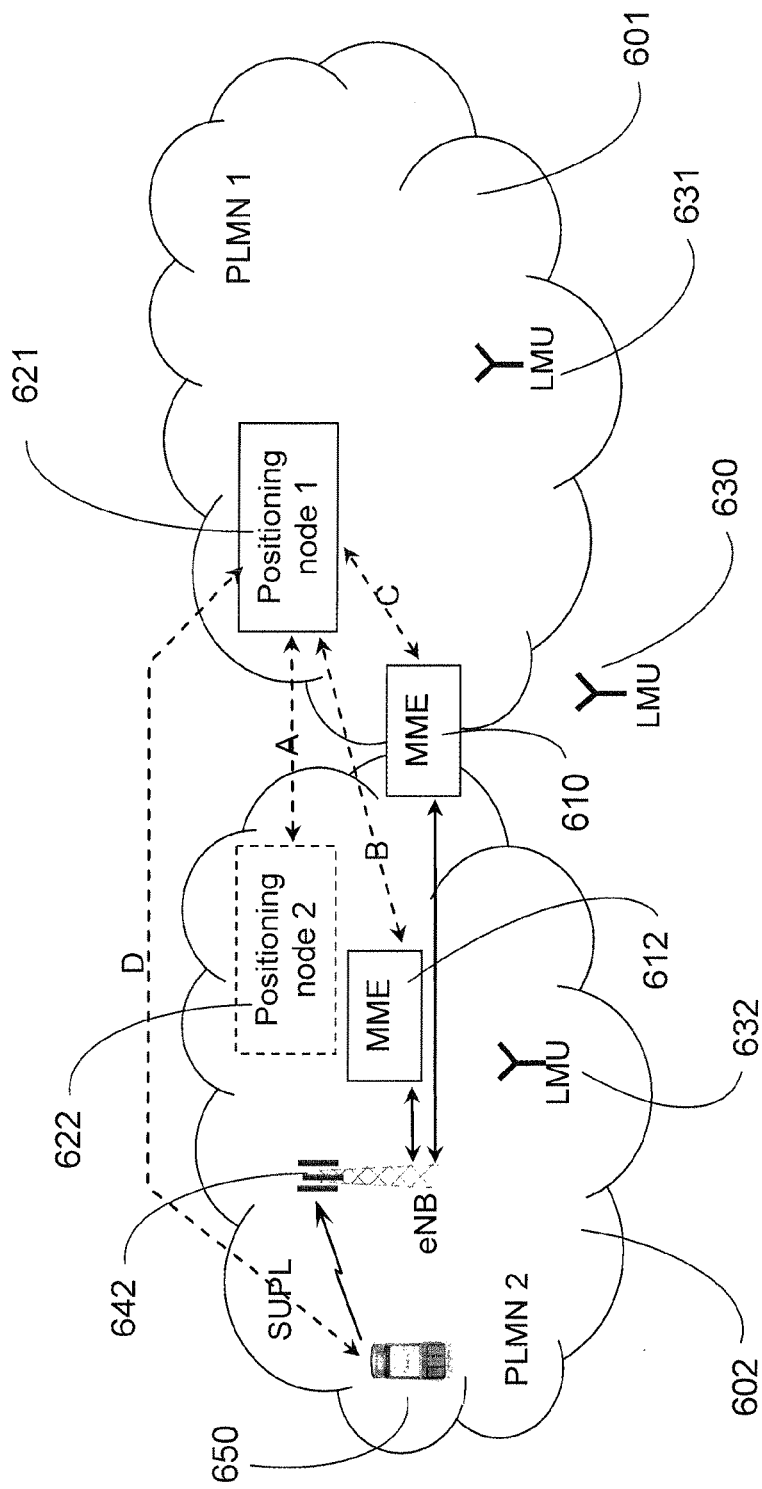
FIG. 6 illustrates an example scenario in which messages may be exchanged between nodes of different PLMNs for positioning.

FIG. 6 illustrates an example scenario in which messages may be exchanged between nodes of different PLMNs for positioning. The scenario in this figure involves first and second PLMNs 601, 602. As seen, there are two nodes—a shared MME 610 and a shared measuring node 630 (e.g., LMU) that are shared by the first and second networks. There are also nodes that are not shared. The first positioning node 621 and the first measuring node 631 are comprised in the first network 601 and are not shared. The second MME 612, the second positioning node 622, the second measuring node 632, and the second radio node 642 are comprised in the second network 602 and are not shared. In this context, when a node is shared by multiple networks, this is an indication that the node can behave as if it is part of (i.e., native to) more than one network.

As seen in FIG. 6, communications between two non-shared nodes are allowed, such as between the first and positioning nodes 621, 622. Also, communications between a shared node and a non-shared node is also allowed such as between the MME 610 and the first positioning node 621. When communicating with the first positioning node 621, the MME 610 may behave as it is a node of the first network 601. Alternatively, the MME 610 may behave as it is a node of a different network such as the second network 601. While not illustrated, communications between shared nodes are also allowed. They may behave as if they are nodes of same or different networks.

Solution 1—Joint Selection of PLMN and Positioning Node

According to one non-limiting aspect, a network node (e.g., MME, a gateway, peer positioning node) may select a PLMN when selecting a positioning node from a list of at least two positioning nodes associated with two different PLMNs. The selected positioning node may be a control plane node, a user plane node, and/or have interfaces to control and/or user plane architectures. The selected PLMN may be the same or different from the PLMN currently associated with the LCS target. The LCS target's PLMN may be the same as that associated with the network node and hence may be known implicitly. In another example, the LCS target's PLMN may be indicated in a message (e.g., Location Request) received by the network node from another node.

Figure 7:
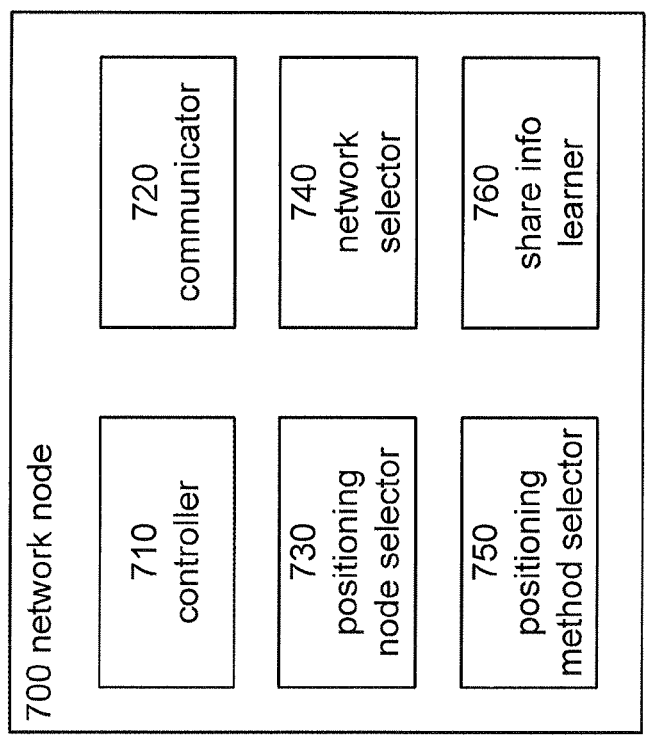
FIG. 7 illustrates an example embodiment of a network node.

FIG. 7 illustrates an example embodiment of a network node 700 structured to jointly select positioning node(s) 621, 622 and corresponding PLMNs (networks) 601, 602. As seen in FIG. 7, the network node 700 may include a controller 710, a communicator 720, a positioning node selector 730, a network selector 740, a positioning method selector 750, and a share info learner 760. The communicator 720 may be structured to perform wired and/or wireless communication with other nodes and/or wireless devices using any of the protocols as described above. The positioning node selector 730 and the network selector 740 may be structured to select positioning node(s) and corresponding PLMN(s) as described above. The positioning method selector 750 may be structured to select positioning method(s) to be used for calculating positions of a target device (e.g., LCS target). The share info learner 760 may be structured to learn any one or more of the sharing capability, capacity, and configuration of one or more measuring nodes. The controller 710 may be structured to control the overall operation of the network node. Details of each component device of the network node 700 will be further provided below in the descriptions of one or more proposed methods of the disclosed subject matter.

Figure 8:
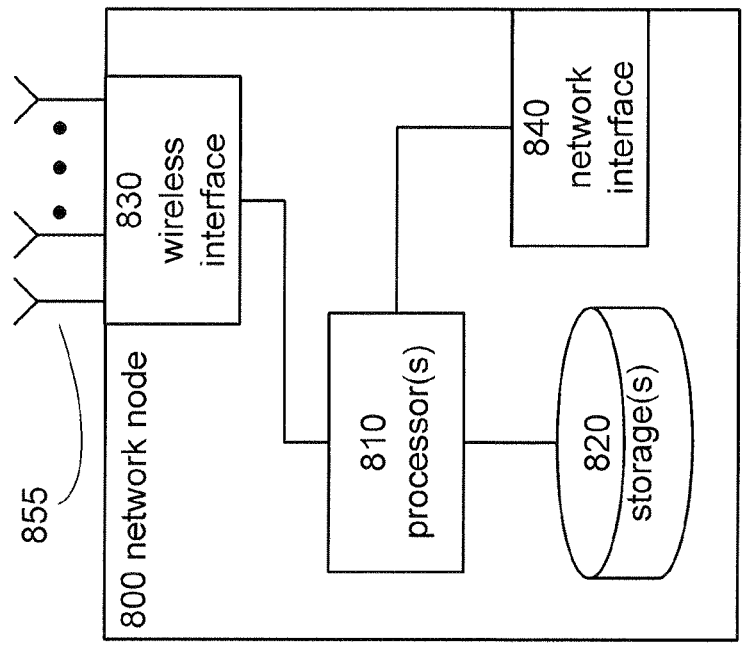
FIG. 8 illustrates another example embodiment of a network node.

FIG. 7 provides a logical view of the network node 700 and the component devices included therein. It is not strictly necessary that each device be implemented as physically separate modules. Some or all component devices may be combined in a physical module. Also, the devices of the network node 700 need not be implemented strictly in hardware. It is envisioned that the component devices can be implemented through any combination of hardware and software. For example, as illustrated in FIG. 8, the network node 800 may include one or more processors 810, one or more storages 820 (internal, external, or both), and one or both of a wireless interface 830 (e.g., in case of a radio network node) and a network interface 840 (in case of a radio network node or a core network node). The processor(s) 810 may be structured to execute program instructions to perform the functions of one or more of the network node devices. The instructions may be stored in a non-transitory storage medium or in firmware (e.g., ROM, RAM, flash) (denoted as storage). Note that the program instructions may also be received through wired and/or wireless transitory medium via one or both of the wireless and network interfaces. The wireless interface 830 (e.g., a transceiver) may be structured to receive wireless signals from and send wireless signals to other radio nodes via one or more antennas 855. The network interface 840 may be included and structured to communicate with other radio and/or core network nodes.

Figure 1B:
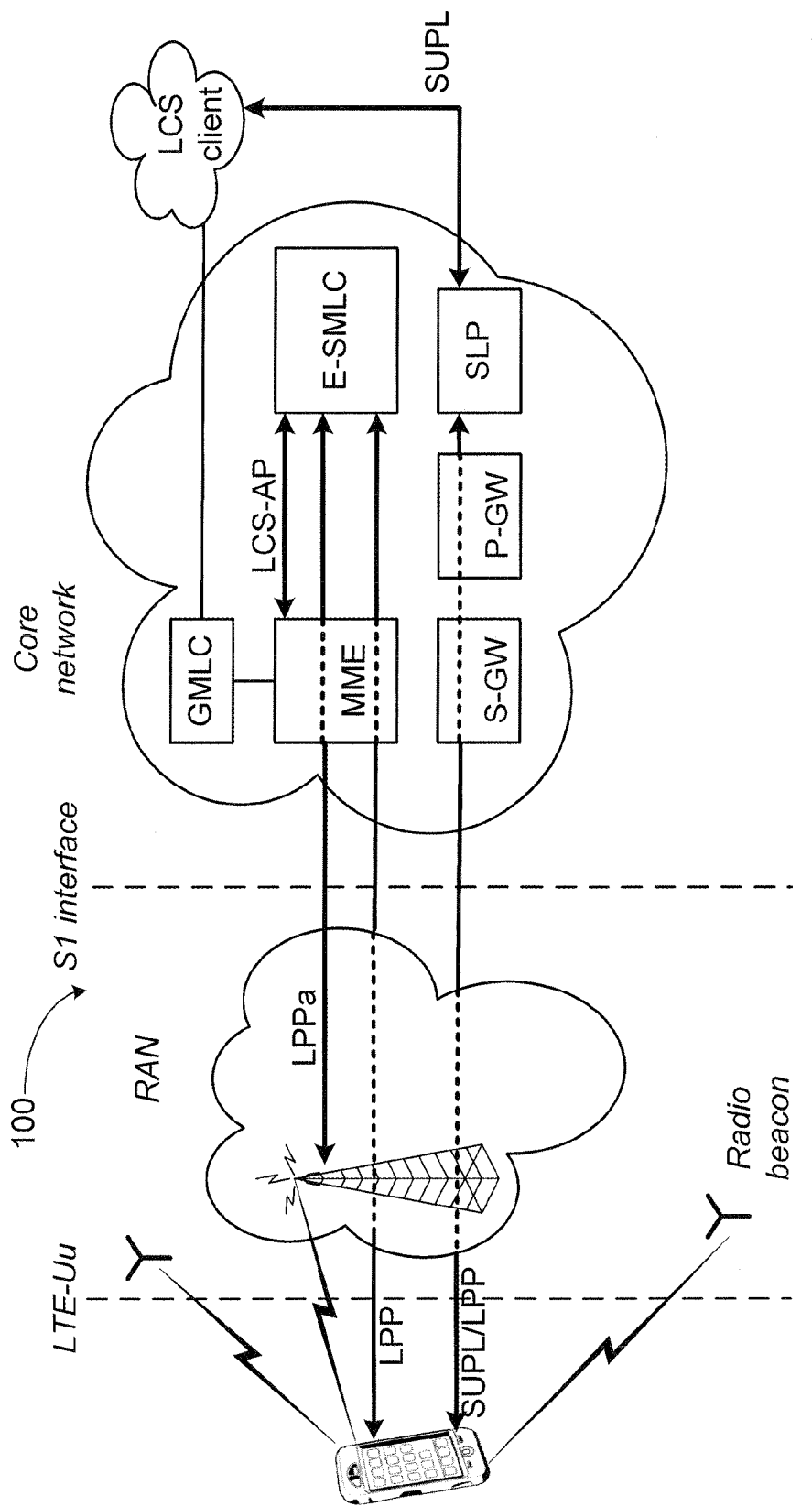
FIG. 1b illustrates an example of a downlink positioning architecture in LTE.
Figure 2:
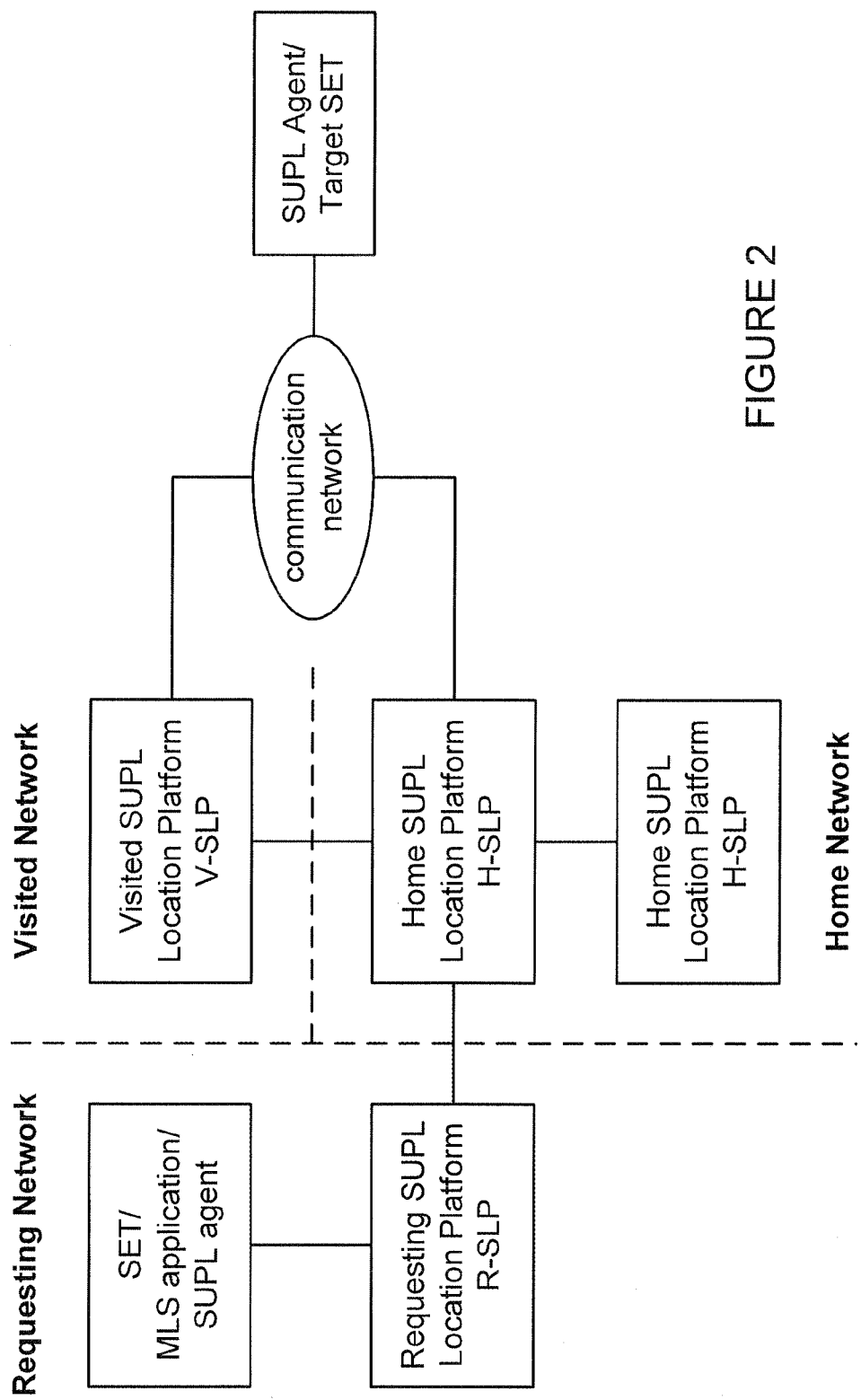
FIG. 2 illustrates an example of a location services architecture in OMA.
Figure 3:
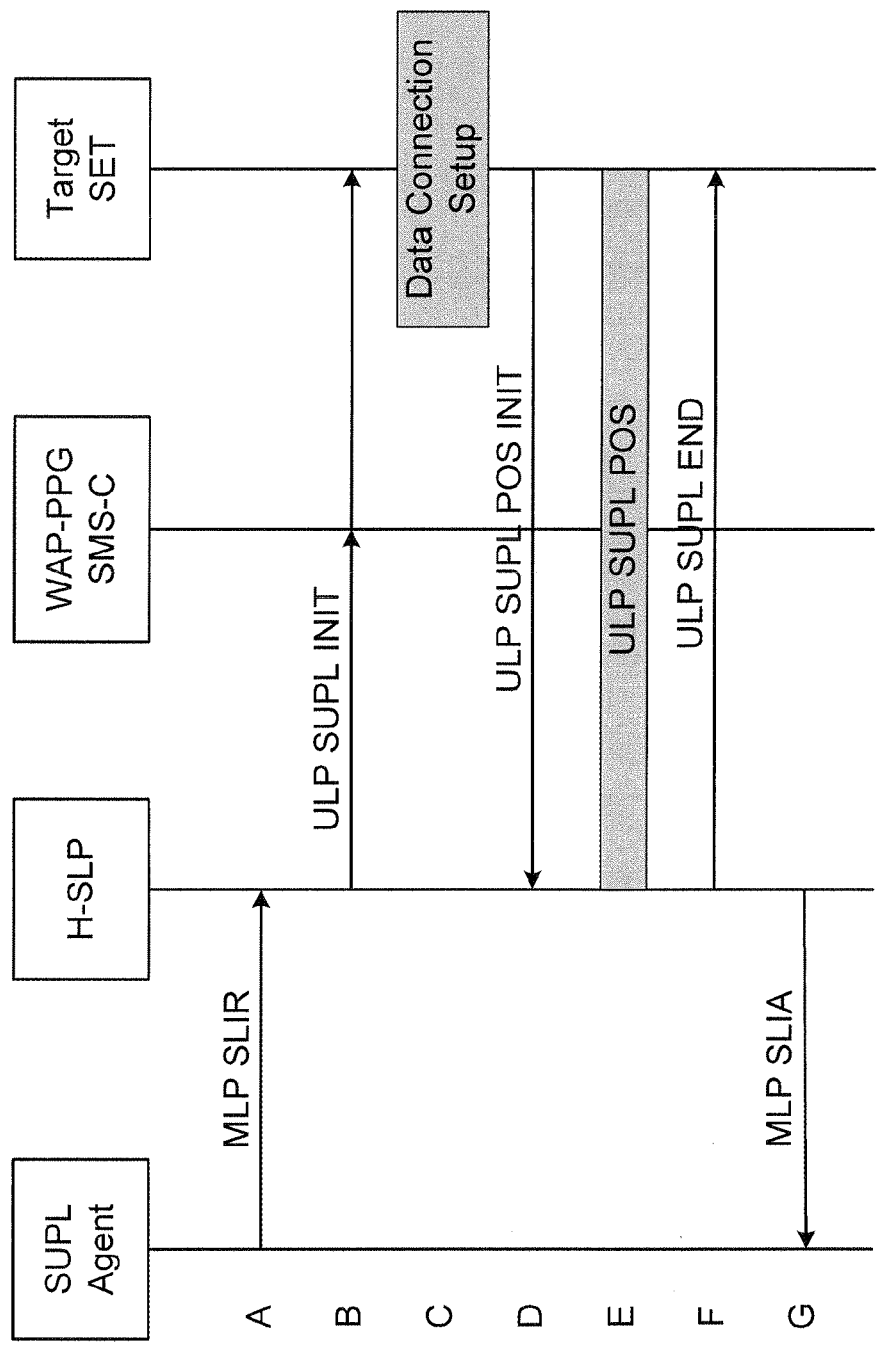
FIG. 3 illustrates an example of a network initiated positioning flow.
Figure 9:
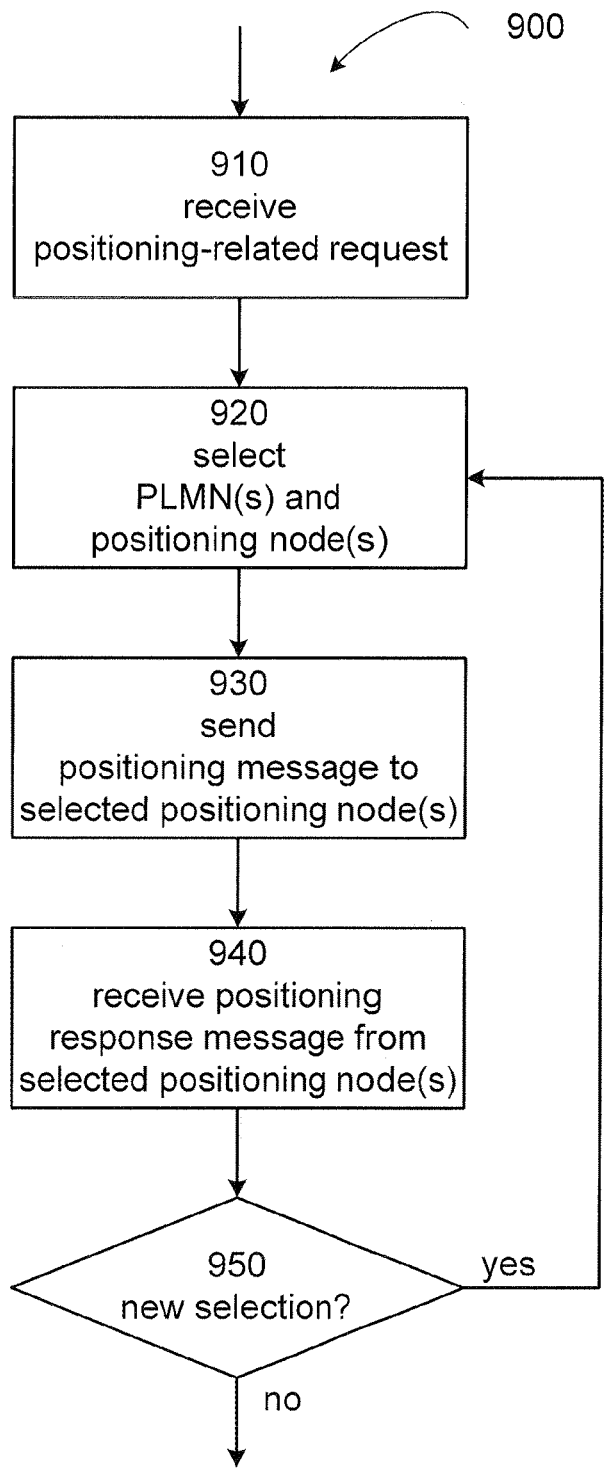
FIG. 9 illustrates a flow chart of an example method performed by a network node to jointly select PLMN and positioning node.

FIG. 9 illustrates a flow chart of an example method 900 performed by the network node 700 to jointly select PLMN and corresponding positioning node. Examples of such network nodes 700 include MMEs, gateways (e.g., S-GW, P-GW), peer positioning node (e.g., E-SMLC, SLP), etc. E.g., see FIGS. 1*a*, 1*b*, 6. As seen, in step 910, the communicator 720 of the network node 700 may receive a positioning-related request from a requesting node. Examples of requesting nodes include SUPL agent, other network nodes (e.g., E-SMLC SLP, MME, MSC, GMLC, O&M, SON, SON), measuring nodes, positioning nodes, etc. The positioning-related request may also be received from an application. Examples of such applications include location-based applications, emergency applications such as PSAP, MDTs, SON applications, and so on. These applications may be running within the network node 700 itself or in other requesting nodes.

The positioning-related request can include any combination of a location request and a positioning data request. The location request in this context may be viewed as a request for the location of the LCS target. For example, the location request may request the GPS coordinates of the LCS target. The positioning data request in this context may be viewed as a request for data or information that may be used to calculate or otherwise determine the location of the LCS target. For example, this may be a request for timing information (e.g., TDOA, OTDOA, ULTOA) of signals measured by a measuring node, CID and/or E-CID related information, angle-of-arrival, etc.

In response to the positioning-related request, in step 920, the positioning node selector 730 and the network selector 740 may select at least one PLMN 601, 602 and at least one positioning node 621, 622 corresponding to each of the selected network 601, 602. Whether only one PLMN is selected or multiple PLMNs are selected, there must be "a" selected PLMN (as well as "a" selected corresponding positioning node). Thus, in step 920, the positioning node selector 730 and the network selector 740 may be said to select a PLMN and a corresponding positioning node. In general, "a" should be broadly interpreted to be "at least one" unless it is made clear explicitly or from the context to mean "just one".

According to one embodiment, the selection decisions in step 920 may be based on any combination of one or more of:
  Positioning QoS information (e.g., included in LCS QoS received in a location request message):
    LCS QoS may include any one or more of: horizontal accuracy, vertical accuracy, confidence level, and response time;
    A positioning node and corresponding PLMN may be selected when any one or more of the positioning information meets or exceeds a threshold. For example, a positioning node and its corresponding PLMN may be selected when the requested accuracy is above a threshold or the response is below a threshold;
  LCS target velocity—For example, a positioning node and a corresponding PLMN may be selected if LCS target velocity is uncertain or exceeds a threshold, and another positioning node and its corresponding PLMN may be selected otherwise;
  LCS Client Type or service type (e.g., emergency):
    In LTE, examples of LCS Client Types include: Emergency Services, Value Added Services, PLMN Operator Services, Lawful Intercept Services, PLMN Operator—broadcast services, PLMN Operator—O&M, PLMN Operator—anonymous statistics, PLMN Operator—Target MS service support;
    For example, a positioning node and its corresponding PLMN may be selected for emergency, and another positioning node and its corresponding PLMN may be selected for commercial services;
  Information requested for positioning (e.g., location or measurements);
  Peer positioning node's capability/availability/load:
    This information may be configured in the network node or may be received from candidate positioning nodes or another network node (e.g., O&M);
    The capability information may include the ability to support any one or more of: certain positioning method, interface to LMUs, certain positioning protocols (LPP/LPPa/LPPe/ULP), etc.
    The availability information may include availability of certain assistance data, availability of connection toward certain eNodeB/MME, availability towards certain SLP, GIS or application server.
    For example, a less loaded positioning node and its corresponding PLMN may be selected;
    In another example, the network may perform a matching between a candidate peer node's capability and requirements for positioning being requested;
  Positioning method (e.g., DL positioning or UL positioning or UTDOA);
  Historical data or collected statistics (e.g., positioning success rate associated with different PLMNs or different positioning nodes)—For example, a positioning node with a higher success rate or more accurate positioning results may be selected or given a higher priority in the selection;
  Availability of a sufficient number of LMUs in a candidate PLMN in the requested tracking area or location area or geographical area:
    For example, determining a set of relevant LMUs and comparing the number of LMUs in the set to a threshold and selecting PLMN with the number of LMUs above a threshold;
  LMU availability and LMU type (e.g., GSM/WCDMA/LTE support) for measurements or LMU load may also be taken into account when selecting the positioning node or PLMN or set of LMUs;
  PLMN priority for positioning purpose—PLMN priority may be preconfigured, determined according to a predefined rule, received from another node, determined based on historical positioning statistics or the load of positioning-related interfaces, the number or the set of support positioning methods, etc.;
  Positioning node priority—Positioning node priority may be preconfigured, determined according to a predefined rule, received from another node, determined based on historical positioning statistics or the load, the number or the set of support positioning methods, etc.

Based on any one or more of the criteria above, the positioning node selector 730 and/or the network selector 740 may select the positioning node and/or the PLMN dynamically, according to a preconfigured table and/or a predefined rule. The PLMN selection result may be different for positioning service than for some other service. As indicated, the selection procedure may be triggered by the received by the network node from another node or an application. Note that the selected PLMN may be different from the PLMN of the LCS target, i.e., the selected network for positioning may be different from the network selected for other services to the target terminal.

Upon selecting the positioning node and the PLMN, in step 930, the communicator 720 may establish a corresponding communication flow for positioning involving the selected positioning node 621, 622, and send a positioning message to the selected positioning node 621, 622. The established positioning flow between the selected network node and the selected positioning node may or may not be associated with a specific positioning session for an LCS target. The selected positioning node 621, 622 in the corresponding PLMN may thus be informed about the selection decision, directly or indirectly.

The positioning message may include any one or more of a positioning request, a measurement request (e.g., timing measurements, received signal power measurements, received signal quality, angle measurements etc. of signals), a message with positioning-related information (e.g., measurement assistance data, LCS target capability information, measurement data, locations of measuring nodes, etc.), a message with positioning-related instruction (e.g., selected positioning method(s), priority, etc.), and information of other selected positioning nodes (locations, cell IDs, availability, capability, etc.).

As indicated above, in step 920, one or a plurality of positioning nodes 621, 622 may be selected to fulfill the positioning related request. Whether one or multiple positioning nodes are selected, each selected positioning node may or may not be aware of whether it is the only one chosen for fulfilling the current positioning-related request or whether there are other parallel positioning nodes and corresponding QoS requirements which have been used for fulfilling the same positioning-related request.

In one embodiment, the selected positioning node 621, 622 may be apprised by the network node 700. For example, when only one is chosen, the to fulfill the positioning-related request, the positioning message sent in step 930 may so indicate to the selected positioning node 621, 622. When a plurality of selecting nodes are chosen, then the positioning message sent to some, preferably all, selected positioning nodes 621, 622 identifies the other selected positioning nodes and corresponding QoS requirements used to fulfill the same positioning-related request.

Therefore the selected positioning node 621, 622 can have an option to prioritize positioning requests and measurement requests, e.g., according to a preconfigured priority list, based on collected data, and/or based on instructions from another node. In one embodiment, the selected positioning node 621, 622 may respond to the network node with a positioning response message which is received by the communicator 720 in step 940. In step 950, the controller 710 may determine whether a new selection procedure should be triggered based on the positioning response message received from the selected positioning node. If so, then network node 700 may repeat the steps 920, 930 and 940. In one embodiment, the new selection procedure may be triggered when the positioning response message indicates any one or more of:

The selection decision (arrived in step 920) is not accepted;
The selection decision has a low priority;
The selection decision is not a first priority (e.g., a request may be put on hold or in a queue); and
The selection decision priority is below a threshold.

The method 900 may apply to DL, UL, or hybrid positioning. The method may apply to all of the above-described scenarios, but may be particularly beneficial in scenarios illustrated in FIGS. 5*a*-5*c*.

Solution 2—Communication Between Positioning Nodes of Different PLMNs

This solution 2 may be standalone or may be combined with other solutions of this disclosure, e.g., the second positioning node may be preconfigured or selected according to Solution 1.

Figure 10:
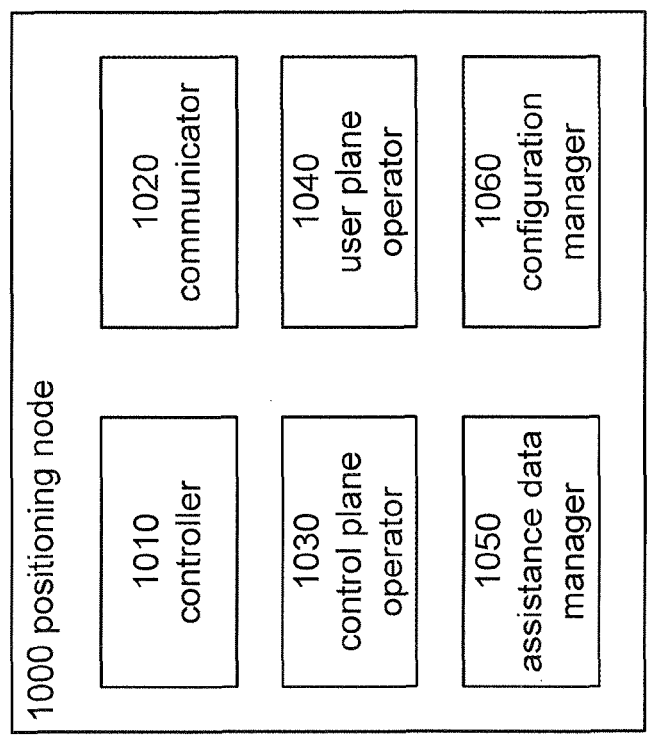
FIG. 10 illustrates an example embodiment of a positioning node.

FIG. 10 illustrates an example embodiment of a positioning node 1000. Positioning nodes 621, 622 of FIG. 6 are examples. As seen in FIG. 10, positioning node 1000 may include a controller 1010, a communicator 1020, an assistance data manager 1050, a configuration manager 1060, and one or both of a control plane operator 1030 and a user plane operator 1040. The communicator 1010 may be structured to perform wired and/or wireless communication with other nodes and/or wireless devices using any of the protocols as described above. The assistance data manager 1050 may be structured to obtain assistance data from and/or provide assistance data to other nodes and/or wireless devices. The configuration manager 1060 may be structured to manage measurement configurations of other nodes including measuring nodes such as LMU. The control plane operator 1030 may be structured to perform control plane positioning procedures and/or interface with control plane architectures. The user plane operator 1040 may be structured to perform user plane positioning procedures and/or interface with user plane architectures. The controller 1010 may be structured to control the overall operation of the positioning node. It should be noted that each of the control plane operator 1030 and the user plane operator 1040 may include its own controller. But in another aspect, the controller 1010 may include one or both of the control plane controller and the user plane controller.

Figure 11:
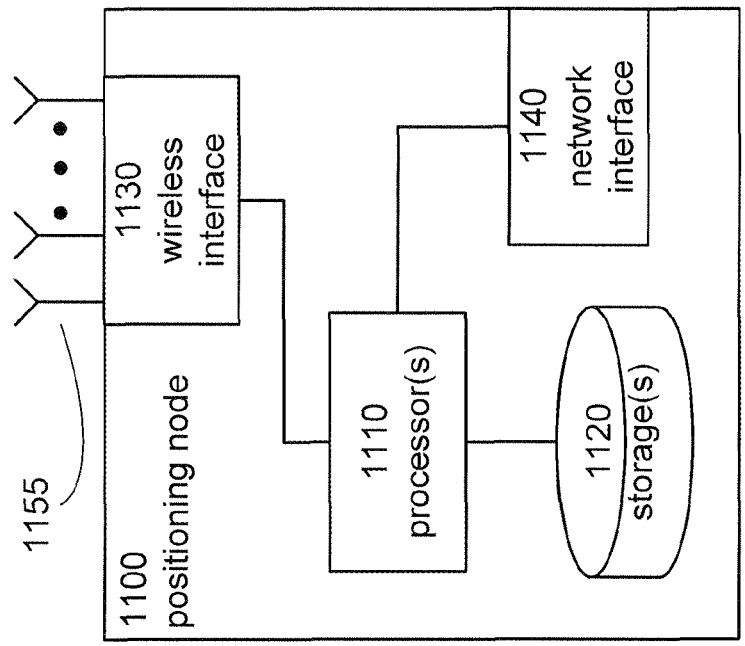
FIG. 11 illustrates another example embodiment of a positioning node.

FIG. 10 provides a logical view of the positioning node 1000 and the component devices included therein. It is not strictly necessary that each device be implemented as physically separate modules. Some or all component devices may be combined in a physical module. Also, the devices of the positioning node 1000 need not be implemented strictly in hardware. It is envisioned that the component devices can be implemented through any combination of hardware and software. For example, as illustrated in FIG. 11, the positioning node 1100 may include one or more processors 1110, one or more storages 1120 (internal, external, or both), and one or both of a wireless interface 1130 (e.g., in case of a radio network node) and a network interface 1140 (in case of a radio network node or a core network node). The processor(s) 1110 may be structured to execute program instructions to perform the functions of one or more of the positioning node devices. The instructions may be stored in a non-transitory storage medium or in firmware (e.g., ROM, RAM, flash) (denoted as storage). Note that the program instructions may also be received through wired and/or or wireless transitory medium via one or both of the wireless and network interfaces. The wireless interface 1130 (e.g., a transceiver) may be structured to receive wireless signals from and send wireless signals to other radio nodes via one or more antennas 1155. The network interface 1140 may be included and structured to communicate with other radio and/or core network nodes.

Figure 4B:
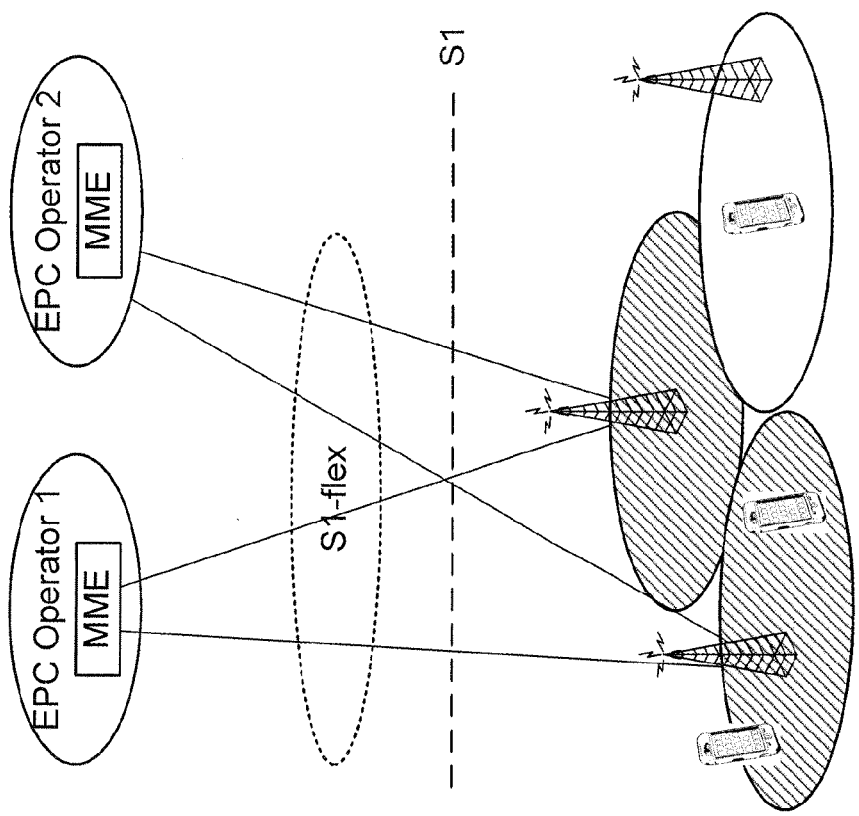
FIG. 4b illustrates an example of a network sharing architecture with multi-operator core network configuration.
Figure 4A:
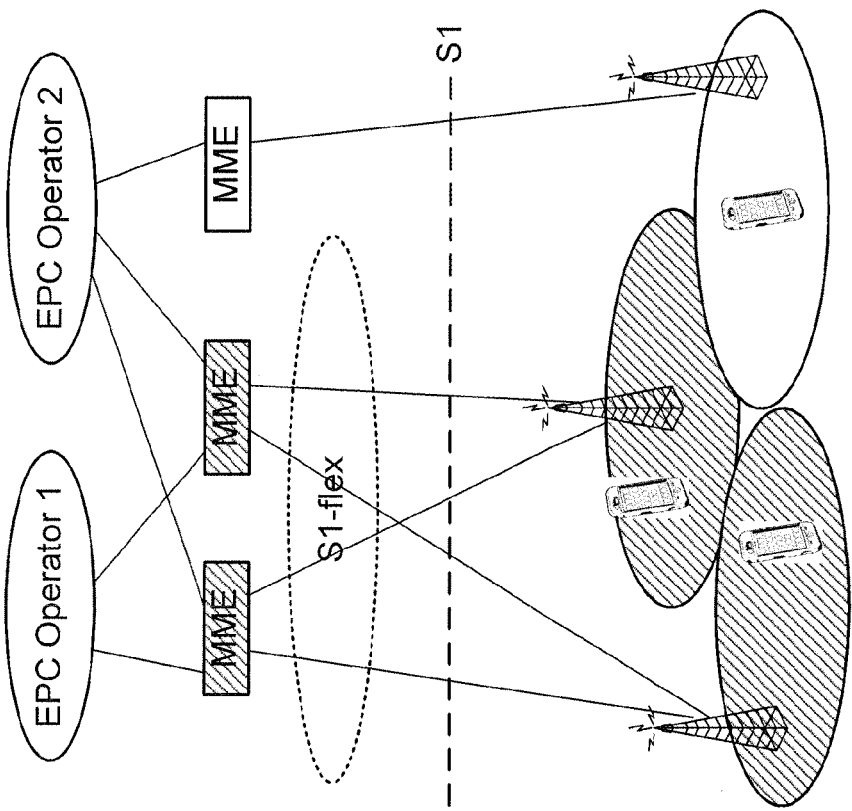
FIG. 4a illustrates an example of a network sharing architecture with a gateway core network configuration.

Referring back to FIG. 6, in one embodiment, the first positioning node 621 comprised in the first network (e.g., a first PLMN) 602 may transmit a message to the second positioning node 622 comprised in a second network (e.g., second PLMN) 602 to support positioning (e.g., with LTE in UTDOA). The communication may be direct (e.g., a new interface which does not exists with the current standard) between the two positioning nodes 621, 622 as indicated by link A. The communication may also be via one or more of other nodes (e.g., via an MME shared by the two PLMNs— see e.g., FIG. 4 with illustrated shared MMEs). As indicated, one or both of the first and the second positioning nodes may comprise a control plane positioning node (e.g., E-SMLC) and/or a user plane positioning node (e.g., SLP).

The message may be transmitted or retransmitted transparently to the first positioning node and originated, e.g., from another node, or may be forwarded by the first positioning node 621. The message may be generated upon a request from the second positioning node 622 or it may be sent to the second positioning node in an unsolicited way.

As indicated, this solution 2 may be combined with other solutions of this disclosure including Solution 1. For example, the first positioning node 621 may perform the method 900 of FIG. 9 to select the second positioning node 622. In this instance, the positioning message transmitted in step 930 may include the message mentioned immediately above and described in further detail below.

The message (e.g., the positioning message) may comprise any one or more of:
- at least one parameter describing configuration of one or more signals/channels used for positioning measurements (e.g., SRS information or PRS/CRS information):
  - Example SRS information include: cell-specific SRS bandwidth, UE-specific SRS configuration, number of antenna ports for SRS transmissions, SRS subframe configuration, SRS frequency domain position, SRS frequency hopping bandwidth configuration, SRS cyclic shift, SRS transmission comb, SRS configuration index, SRS MaxUpPt used for TDD, parameters indicating enabling/disabling SRS sequence hopping or SRS sequence-group hopping, parameter related to configuring aperiodic SRS, transmit or measurement pattern of SRS;
  - Example PRS/CRS information include: PRS configuration index, periodicity, reference signal bandwidth, PCI used to generate reference signals, PRS muting pattern or time instances in which reference signals are transmitted, cell or carrier frequency with transmitted reference signals for positioning;
  - Source: the first positioning node may receive this information from another node e.g., eNodeB/UE/LMU;
  - Usage: upon receiving the information, the second positioning node may use this information in different ways including any one or more of:
    - starting/restarting positioning flow;
    - selecting the number and the set of measuring nodes;
    - using for analyzing the measurement result;
    - forwarding the information to one or more other nodes to start/configure/reconfigure positioning measurements (e.g., send to LMUs in case of UTDOA);
- Measuring node (e.g., LMU/eNodeB/UE) information that include:
  - any one or more of: a list of measuring nodes associated with the first positioning node, measuring node's identity, PLMN ID, measuring node's capability, availability for performing measurements (e.g., busy/not busy, availability/busy time period, the number of on-going measurements or the number of acceptable new measurement requests), and configuration (e.g., frequency, bandwidth, maximum number of parallel measurements/measurement requests, measurement pattern configuration, etc.);
  - Source: the first positioning node may get the availability or configuration information from the measuring node:
    - a set of measuring nodes' identities may be configured or maintained in the first positioning node or may be received from another node;
  - Usage: upon receiving the information, the second positioning node may:
    - use a list of LMUs received from the positioning node when configuring LMUs for UTDOA measurements;
    - select a set of measuring nodes and request positioning measurements from the measuring nodes (e.g., LMUs) that are available for measurements or less occupied.
- assistance data for positioning measurements (see e.g., Solution 3);
- positioning request (e.g., Location Request or similar) or positioning measurement request:
  - Source: the first positioning node may receive a request from another node (e.g., MME) and may forward to a second positioning node which is preconfigured or determined by the request, or the first positioning node may determine the second positioning node, i.e., decide to which peer positioning node to send position request, e.g., based on one or both of:
    - capability/availability of peer node;
    - requested content, e.g., either measurement and/or location result may be wanted;
  - Usage: upon receiving, the second positioning node may:
    - initiate a positioning flow such as request location or request measurements from measuring nodes or calculate location;
    - respond to the sending node (first positioning node) with requested data or a result of a taken action triggered by the received request;
- positioning response (e.g., Location Response or similar) or positioning result:
  - Source: the first positioning node may:
    - calculate an LCS target location based on received measurements (e.g., from a positioning node or measuring nodes);
    - receive the location information from another node;
    - the response message may be in response to an earlier received request from the second positioning node or another node;
  - Usage: upon receiving a message comprising the response, the second positioning node may send a positioning response to the requesting node (e.g., MME, LCS Client, PSAP, etc.);
- positioning measurements:
  - Source: the first positioning node may receive positioning node measurements from another node (e.g., one or more measuring nodes such as UE/eNodeB/LMU);
  - Usage: upon receiving from the first positioning node, the second positioning node may use the measurements, e.g., for position calculation the result of which may then be sent to another node (e.g., to the first positioning node or MME or LCS Client)
- Positioning node's capability/availability, e.g.:
  - ability to support certain positioning method, interface to LMUs, certain positioning protocols (LPP/LPPa/LPPe/ULP);
  - availability of certain assistance data, availability of connection toward certain eNB/MME, availability towards certain SLP, GIS or application server.
- Target wireless device identity or a characteristic of signals transmitted by the wireless device (e.g., RNTI);

PLMN identity of the first positioning node and/or of the second positioning node and/or of the LCS target.

Solution 2 may apply to DL, UL, or hybrid positioning. Solution 2 may apply to all of the above-described scenarios, but may be particularly beneficial for scenarios 5a-5b.

Solution 3—Obtain and Use Positioning Assistance Data Associated with PLMN Different from that of Positioning Node This solution may be standalone or may be combined with other solutions in this disclosure, e.g., Solution 1 and/or Solution 2.

Again referring back to FIG. 6, according to one embodiment, the first positioning node 621 comprised in the first network 601 may obtain positioning assistance data for UL positioning (e.g., UTDOA). The positioning assistance data may be associated with the second network 602 which is different from the first network 601 of the first positioning node. This assistance data may further comprise the information about configuration of signals or channels measured by a measuring node (e.g., LMU 630, 631, 632) for UL positioning, e.g., configuration of Sounding Reference Signals (SRS) transmitted by a wireless device attached to the first network.

FIG. 12 illustrates a flow chart of an example method 1200 performed by a positioning node to obtain and use positioning assistance with PLMN different from the positioning node. In this figure, it is assumed that the first positioning node 621 of the first PLMN 601 is performing the method 1200. As seen in FIG. 12, in step 1210, the assistance data manager 1050 may obtain assistance data associated with the second PLMN 602. The first positioning node 621 may obtain the assistance data from a variety of sources including from one or more of:
- the second positioning node (see, e.g., Solution 2 and signaling link A with second positioning node 622 in FIG. 6) via an inter-network interface, where the second positioning node 622 may receive these data e.g., from the serving eNodeB 642;
- another network node (comprised in the second network via an inter-network interface (e.g., signaling link B with MME 612 in FIG. 6);
- another network node comprised in the first network and the second network (e.g., signaling link C with MME 610 in FIG. 6);
- a database (e.g., with cell data associated with the second network 602 and stored in the first network 601);
- a wireless device 650 comprised in the second network (e.g., by SUPL via gateway nodes—see communication link D with LCS target 650 in FIG. 6);
- O&M node;
- SON node;
- historical data collected during historical positioning sessions towards one or more terminals—historical data can be used as assistance data directly or after processing/calculation.

The assistance data may be requested by the first positioning node 621 to any of the nodes in the same PLMN and/or nodes in a different PLMN. The assistance data may also be provided to the first positioning node 621 in an unsolicited way from the any of nodes in the same PLMN and/or nodes in a different PLMN. In step 1220, the configuration manager 1060 may use the assistance data for configuring measurements in a measuring node 630, 631, 632. For example, the first positioning node 621 can provide the obtained assistance data to an LMU, where the LMU may be comprised in the first and/or second networks 601, 602 or even in a third network.

Prior obtaining the assistance data, the first positioning node 621 may also request or indicate the need for UL transmissions transmitted by the LCS target device 650 to enable UL positioning in step 1205. This request or indication message may be signaled by the first positioning node 621 to any one or more of:
- second positioning node 622 comprised in the second network 602 (which may further signal it, e.g., to the serving eNodeB 642);
- another network node comprised in the second network via an inter-network interface (e.g., signaling link B with MME 612 in FIG. 7) which may further signal it, e.g., to the serving eNodeB 642;
- another network node comprised in the first network and the second network (e.g., signaling link C with MME 610 in FIG. 7) which may further signal it, e.g., to the serving eNodeB 642;
- a wireless device comprised in the second network (e.g., by SUPL via gateway nodes—see communication link D with device 650 in FIG. 7), where the wireless device may:
  configure the necessary transmissions;
  indicate/request from the serving radio network node;
  indicate to the first positioning node whether the necessary transmissions are configured;
- a measuring node (e.g., LMU);
  the received request may be comprised in a measurement request;
  the received request may be further sent to, e.g., serving eNodeB via an eNodeB-to-LMU interface (may be internal for integrated LMUs).

Solution 3 may apply to DL, UL, or hybrid positioning. Solution 3 may apply to all of the above-described scenarios, but may be particularly beneficial for scenarios 5b-5d.

Solution 4—Positioning Measurement Coordination in Multi-PLMN

Measuring nodes, e.g., LMUs, typically do not need the PLMN information to perform radio measurements. However, positioning node (and also PLMN) association may still be needed for communication between the measuring node and other network nodes which may belong to different PLMNs. Communication across PLMN may require special procedures and therefore may be more complex, but on the other hand, cross-PLMN communication can provide advantages of network sharing for positioning (e.g., cost sharing among operators, load sharing among nodes or interfaces, etc.). Further, in multi-PLMN scenarios, there is still a possibility to schedule measurement within one PLMN (same or different) and across multiple PLMNs (e.g., involving multiple positioning nodes). Hence positioning measurement coordination while taking into account PLMN is more challenging than operating in a single-PLMN scenario.

According to one or more non-limiting embodiments in this aspect, an LMU may be associated with one or more positioning nodes, one or more PLMNs. It may also receive messages from positioning nodes comprised in different PLMNs, directly (FIG. 5c) or via one or more intermediates nodes (FIG. 5d).

Sharing Capability, Sharing Capacity, Sharing Configuration

According an aspect of the disclosed subject matter, there exists an LMU capability indicating the LMU's ability to receive and process the information (e.g., measurement assistance data) from more than one positioning nodes, also referred to as sharing capability. The sharing capability information is particularly beneficial in deployments when not all measuring nodes are capable of sharing connections. In one example, the sharing capability may comprise the ability to support simultaneous connections with more than one positioning node. In another example, the sharing capability may comprise the ability to dynamically establish and/or change connection between two or more positioning nodes and thereby enable communication with two or more positioning nodes.

According to another embodiment, a measuring node (e.g., LMU) may also be characterized by a sharing capacity. As an illustration, sharing capacity can refer to a maximum number of statically or dynamically shared connections.

According to yet another embodiment, a measuring node (e.g., LMU) may also be characterized by the current number of shared connections, which can be referred to as sharing configuration. Note that the sharing configuration (e.g., the current number of shared connections) should not exceed the sharing capacity (e.g., the maximum number of shared connections).

Any of the above sharing capability, sharing capacity and sharing configuration information may be maintained by the measuring node and may be signaled to another node, e.g., positioning node, O&M, SON, a coordinating node. According to another embodiment, this information may be preconfigured and stored in another network node (e.g., positioning node, O&M, SON, or a coordinating node).

Figure 13:
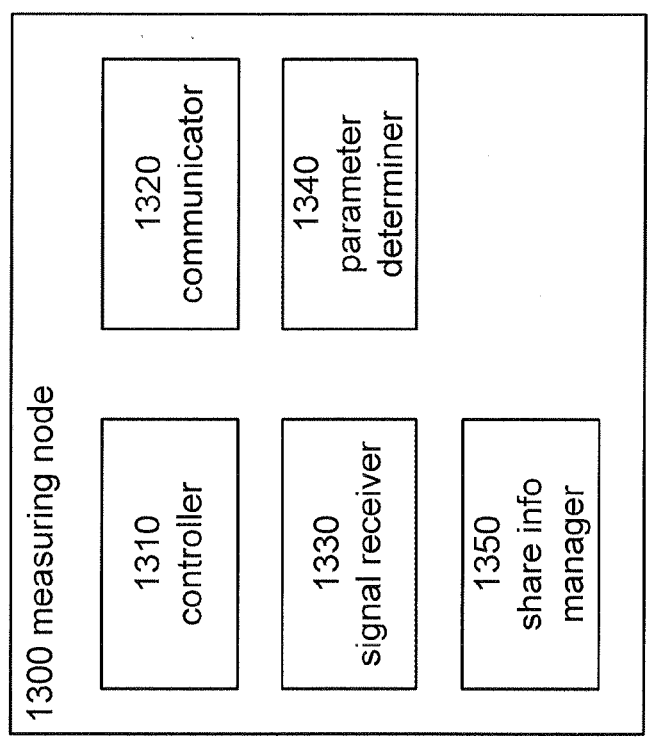
FIG. 13 illustrates an example embodiment of a measuring node.

FIG. 13 illustrates an example embodiment of a measuring node 1300. As seen, the measuring node 1300 may include a controller 1310, a communicator 1320, a signal receiver 1330, a parameter determiner 1340, and a share info manager 1350. The communicator 1320 may be structured to perform wired and/or wireless communication with other nodes and/or wireless devices using any of the protocols as described above. The signal receiver 1330 may be structured to receive signals that are to be measured. The parameter determiner 1340 may be structured to determine parameters or characteristics of the signals received by the signal receiver 1330. Such parameters include timing, power, angle of arrival, etc of the signals. The parameter determiner 1340 may also be structured to provide the determined parameters to other nodes, of the same or different PLMNs. The share info manager 1350 may be structured to manage share information such as capability, capacity, configuration, etc.

Figure 14:
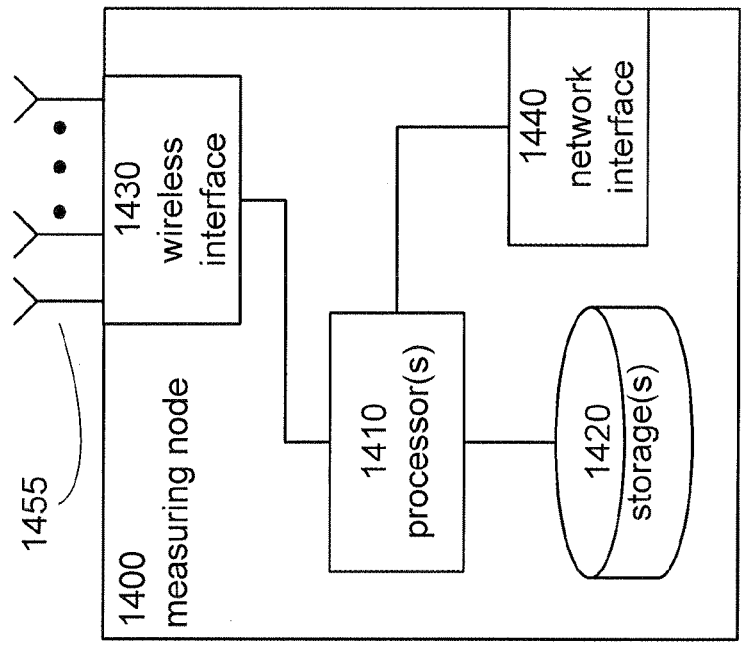
FIG. 14 illustrates another example embodiment of a measuring node.

FIG. 13 provides a logical view of the measuring node 1300 and the component devices included therein. It is not strictly necessary that each device be implemented as physically separate modules. Some or all component devices may be combined in a physical module. Also, the devices of the measuring node 1300 need not be implemented strictly in hardware. It is envisioned that the component devices can be implemented through any combination of hardware and software. For example, as illustrated in FIG. 14, the measuring node 1400 may include one or more processors 1410, one or more storages 1420 (internal, external, or both), and one or both of a wireless interface 1430 (e.g., in case of a radio network node) and a network interface 1440 (in case of a radio network node or a core network node). The processor(s) 1410 may be structured to execute program instructions to perform the functions of one or more of the positioning node devices. The instructions may be stored in a non-transitory storage medium or in firmware (e.g., ROM, RAM, flash) (denoted as storage). Note that the program instructions may also be received through wired and/or or wireless transitory medium via one or both of the wireless and network interfaces. The wireless interface 1430 (e.g., a transceiver) may be structured to receive wireless signals from and send wireless signals to other radio nodes via one or more antennas 1455. The network interface 1440 may be included and structured to communicate with other radio and/or core network nodes.

In yet another embodiment, a network mode (e.g., positioning node) may learn (discover, determine, guess or otherwise estimate) the measuring node's sharing capability, capacity, and/or configuration based on the collected history positioning data and/or positioning session information. For example, the sharing capability may be discovered through a shared connection (in as little as a single occurrence); the sharing configuration may be assumed to be valid during a preconfigured time; and the sharing capacity may be defined as the maximum number of shared connections observed over a time. The "learned" sharing capability, capacity or configuration may also be shared by the "learning" network node with another node (e.g., positioning node, O&M, SON, etc.).

Positioning node may use this LMU capability information, e.g., when deciding a set of measuring nodes for UTDOA. In one example, a shared LMU may be given a different priority in the selection than an LMU used only by the current positioning node. A lower priority may be used, e.g., when the shared LMU has a higher probability of being occupied or delaying measurements and measurement response.

Figure 15:
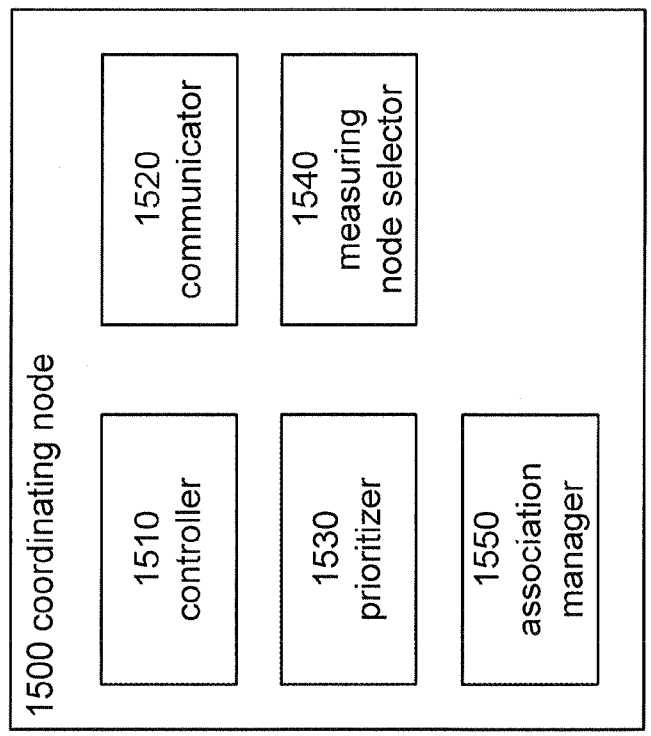
FIG. 15 illustrates an example embodiment of a coordinating node.

FIG. 15 illustrates an example embodiment 1500 of a coordinating node. The coordinating node 1500 may include a controller 1510, a communicator 1520, a prioritizer 1530, a measuring node selector 1540, and an association manager 1550. The communicator 1510 may be structured to perform wired and/or wireless communication with other nodes and/or wireless devices using any of the protocols as described above. The prioritizer 1530 may be structured to prioritize among positioning nodes, measuring nodes, and PLMNs. The measuring node selector 1540 may be structured to select a set of measuring nodes, e.g., for cross-PLMN coordination. The association manager 1550 may be structured to associate and/or determine associations among the measuring nodes, the positioning nodes, and the PLMNs. The controller 1510 may be structured to control the overall operation of the coordinating node.

Figure 16:
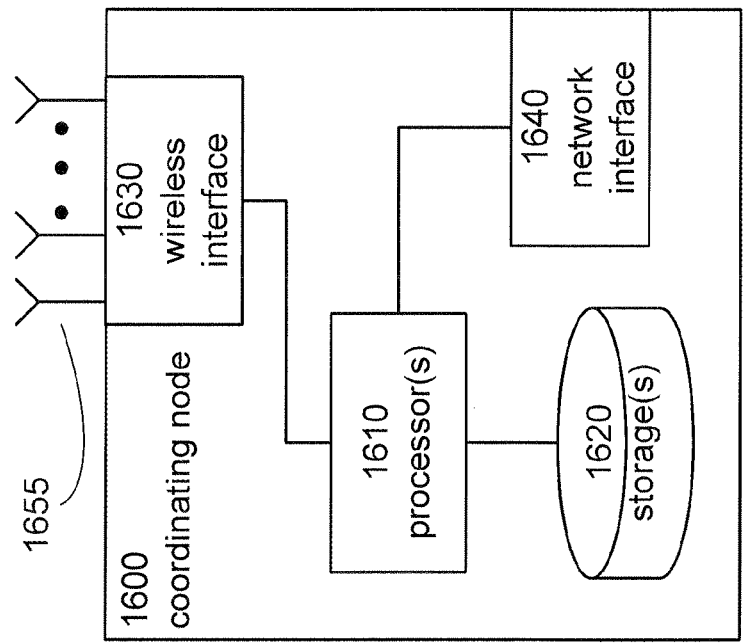
FIG. 16 illustrates another example embodiment of a coordinating node.

FIG. 15 provides a logical view of the coordinating node 1500 and the component devices included therein. It is not strictly necessary that each device be implemented as physically separate modules. Some or all component devices may be combined in a physical module. Also, the devices of the coordinating node 1500 need not be implemented strictly in hardware. It is envisioned that the component devices can be implemented through any combination of hardware and software. For example, as illustrated in FIG. 16, the coordinating node 1600 may include one or more processors 1610, one or more storages 1620 (internal, external, or both), and one or both of a wireless interface 1630 (e.g., in case of a radio network node) and a network interface 1640 (in case of a radio network node or a core network node). The processor(s) 1610 may be structured to execute program instructions to perform the functions of one or more of the positioning node devices. The instructions may be stored in a non-transitory storage medium or in firmware (e.g., ROM, RAM, flash) (denoted as storage). Note that the program instructions may also be received through wired and/or or wireless transitory medium via one or both of the wireless and network interfaces. The wireless interface 1630 (e.g., a transceiver) may be structured to receive wireless signals from and send wireless signals to other radio nodes via one or more antennas 1655. The network interface 1640 may be included and structured to communicate with other radio and/or core network nodes.

FIG. 17 illustrates a flow chart of an example method 1700 performed by a coordinating node 1500 positioning measurement coordination. In step 1710, the association manager 1550 via the communicator 1520 may gather share info on one or more measuring nodes, e.g., LMU, eNB, UE. The sharing info may be any one or more of a sharing capability, sharing capacity, and sharing configuration for each of the measuring nodes. The descriptions of the sharing capability, capacity, and configuration are described above, and thus will not be repeated here. In step 1720, the measuring node selector 1540 may select a set of measuring nodes based on the gathered share info of the measuring nodes. In step 1720, the measuring node selector 1540 may select the set of measuring nodes taking into account the priorities determined by the prioritizer 1530 and/or the associations determined by the association manager 1550. Some example coordination considerations are provided in further detail below.

Figure 18:
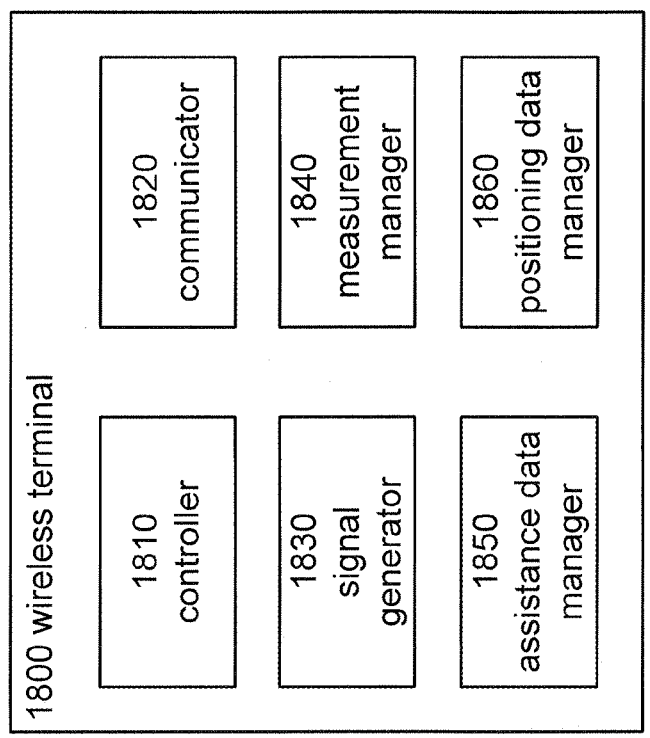
FIG. 18 illustrates an example embodiment of a wireless terminal.

FIG. 18 illustrates an example embodiment 1800 of a wireless terminal such as a SET enabled terminal. The wireless terminal 1800 may include a controller 1810, a communicator 1820, a signal generator 1830, a measurement manager 1840, assistance data manager 1850, and a positioning data manager. The communicator 1810 may be structured to perform wireless communication with other nodes and/or or wireless terminals using any of the protocols as described above. The signal generator 1830 may be structured to generate signals used for UL measurement, e.g., SRS. Note that data signals may also be used for measurements. The measurement manager 1840 may be structured to perform measurements of signals from radio network nodes or from other wireless terminals and to provide feedback to the network regarding the measurements. The assistance data manager 1850 may be structured to provide assistance to the network and/or receive assistance data from the network. The positioning data manager 1860 may be structured receive positioning data and/or provide positioning data to the network. The positioning data manager 1860 may also be structured to calculate the location of the wireless terminal 1800.

Figure 19:
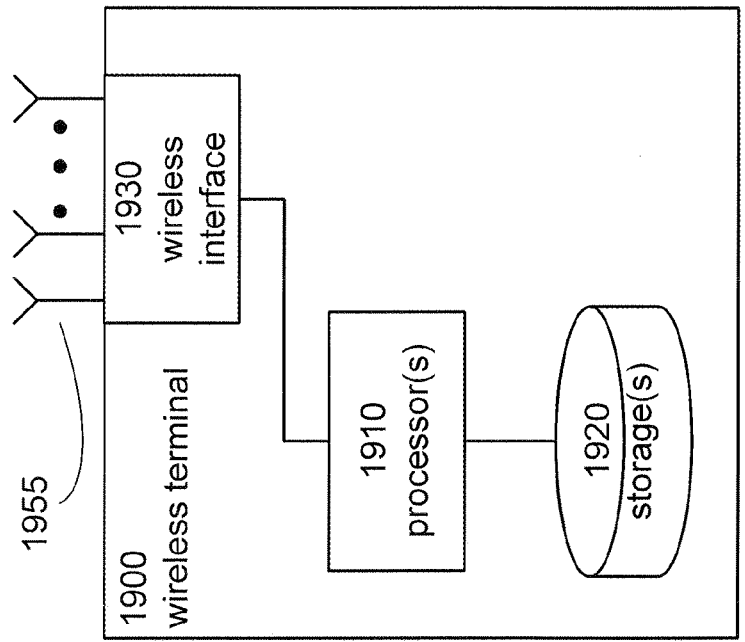
FIG. 19 illustrates another example embodiment of a wireless terminal.

FIG. 18 provides a logical view of the wireless terminal 1800 and the component devices included therein. It is not strictly necessary that each device be implemented as physically separate modules. Some or all component devices may be combined in a physical module. Also, the devices of the wireless terminal 1800 need not be implemented strictly in hardware. It is envisioned that the component devices can be implemented through any combination of hardware and software. For example, as illustrated in FIG. 19, the wireless terminal 1900 may include one or more processors 1910, one or more storages 1920 (internal, external, or both), and a wireless interface 1930. The processor(s) 1910 may be structured to execute program instructions to perform the functions of one or more of the positioning node devices. The instructions may be stored in a non-transitory storage medium or in firmware (e.g., ROM, RAM, flash) (denoted as storage). Note that the program instructions may also be received through wired and/or or wireless transitory medium via one or both of the wireless and network interfaces. The wireless interface 1930 (e.g., a transceiver) may be structured to receive wireless signals from and send wireless signals to other radio nodes via one or more antennas 1955.

PLMN and Positioning Node Prioritization

One way to enable coordination of positioning measurements in multi-PLMN scenarios is to use a prioritization scheme. The prioritization may be configured statically, semi-statically or dynamically. It may be preconfigured or decided by a predefined rule.

The PLMN and positioning node prioritization may be known at any one or more of: measuring nodes (e.g., LMUs), positioning node, or another network node. In one example, an LMU which may be shared by two or more positioning nodes can have a primary positioning node and one or more secondary positioning nodes. There may also be primary PLMN and secondary PLMN. The communication or positioning measurement coordination involving the secondary positioning node or secondary PLMN may have some restrictions compared to the primary, may have a lower priority, or may have a different measurement QoS or positioning QoS.

In another example, via the primary positioning node, the LMU may also receive the information generated in another positioning node, e.g., in a transparent container from which the LMU is able to extract the another-positioning node information, where the communication between the two positioning nodes may be direct or via intermediate nodes (see, e.g., Solution 2).

Cross-PLMN Coordination of Positioning Measurements

In one or more embodiments, a positioning node can perform cross-PLMN coordination of positioning measurements which may comprise any one or more of:
 selection of measuring nodes;
 associating measuring nodes with a positioning node and PLMN,
 sending measurement requests and receiving a measurement reports,
 obtaining assistance data (see e.g. Solution 3),
 using measurements for position calculation (e.g., jointly using measurements collected from more than one positioning nodes and/or PLMNs).

Some example decisions made in a network node (e.g., positioning node) may include any one or more of:
 Selecting for one LCS target a set of measuring nodes associated with a different (from that associated with the LCS target) positioning node (and PLMN):
 all selected measuring nodes may be associated with the same or different positioning node (and PLMN);
 Selecting measuring nodes associated with two or more positioning nodes (and PLMN) for the same LCS target;
 Selecting measuring nodes associated with different positioning nodes (and PLMN) for different LCS targets;
 Selecting a measuring node while associating it with different positioning nodes (and PLMN) for different LCS targets.

For this new functionality, information available in the network node may be used including any one or more of: collected history positioning data, positioning performance statistics, individual LMU measurement performance (e.g., delay or accuracy) statistics, target positioning QoS, LCS Client Type or Service Type, preliminary rough LCS target location estimate, LCS target speed, etc.

The multi-PLMN decisions may be further enhanced by using any of the information described herein such as sharing capability, sharing capacity, and sharing configuration. For example, a positioning node may use the sharing information as follows:
 To assign priorities. When deciding a set of measuring nodes for UTDOA, a shared LMU may be given a different priority in the selection than an LMU used only by the current PLMN. A lower priority may be used, e.g., when the shared LMU has a higher probability of being occupied or delaying measurements and measurement response, or the required QoS is not likely to be fulfilled by using only the native LMUs, or due to inter-operator charging reasons;
 To avoid sending redundant measurement requests to the same LMU by different positioning nodes. When a request is partly served by the first positioning node and forwarded to the second positioning node to ensure a sufficient number of LMUs for a positioning request (see, e.g., Solution 2). The shared LMUs are used by one positioning node. For example the second positioning node may request measurements only from LMUs with no PLMN-sharing capability in the second positioning node's coverage (e.g., two left most LMUs in FIG. 5*c*) while the first positioning node may request measurements from all others LMUs.

Positioning measurement coordination may be implemented in a coordinating node or a master node or this functionality (positioning measurement coordination decisions) may be distributed, at least in part, among two or more nodes.

Solution 4 in multi-PLMN scenarios may apply to DL, UL, or hybrid positioning. The same may apply to all of the above-described scenarios, but may be particularly beneficial for scenarios 5c-5d. It may also be beneficial for scenarios 5a-5b when one positioning node communicates with LMUs via another positioning node.

Although the description above contains many specifics, these should not be construed as limiting the scope of the disclosed subject matter but as merely providing illustrations of some of the presently preferred embodiments. Therefore, it will be appreciated that the scope of the disclosed subject matter fully encompasses other embodiments which may become obvious to those skilled in the art, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed by a network node, the method comprising:
   receiving a positioning-related request from a requesting node or an application;
   selecting a Public Land Mobile Network, PLMN, and a positioning node of the selected PLMN in response to the positioning-related request;
   sending a positioning message to the selected positioning node, wherein the positioning message indicates to the selected positioning node that it is the only positioning node chosen for fulfilling the positioning-related request; and
   receiving a positioning response message from the selected positioning node,
   wherein the positioning-related request includes any combination of a location request and a positioning data request,
   wherein the location request is a request for a location of a Location Services, LCS, target, and
   wherein the positioning data request is a request for data that may be used to determine the location of the LCS target.

2. The method of claim 1, wherein the PLMN and the positioning node are selected based on any combination of:
   positioning Quality of Service, QoS, information included in the location request, LCS target velocity, LCS client type, service type, location request, measurement request, peer positioning node's capability, peer positioning node's availability, peer positioning node's load, positioning method, historical data, collected statistics, availability of a sufficient number of Location Measurement Units, LMUs, in a candidate PLMN in a requested tracking area or location area or geographical area, PLMN priority for positioning, and positioning node priority.

3. The method of claim 1, wherein the positioning message sent to the selected positioning node includes any one or more of a positioning request, a measurement request, a message with positioning-related information, a message with positioning-related instruction, and information of other selected positioning nodes.

4. The method of claim 1, wherein in the step of selecting the PLMN and the positioning node, a plurality of positioning nodes are selected in parallel to fulfill the positioning-related request.

5. The method of claim 4, wherein the positioning message is sent to at least one positioning node, and the positioning message identifies one or more other selected positioning nodes and corresponding QoS requirements which are used for fulfilling the same positioning-related request.

6. The method of claim 1, further comprising:
   determining whether a new selection procedure should be triggered based on the positioning response message received from the selected positioning node; and
   repeating the step of selecting the PLMN and positioning node in response to the positioning-related request when it is determined that the new selection procedure should be triggered.

7. The method of claim 6, wherein the new selection procedure is triggered when the positioning response message indicates one or more of:
   the selection decision is not accepted,
   the selection decision has a low priority,
   the selection decision is not a first priority, and
   the selection decision has a priority below a threshold priority.

8. The method of claim 1,
   wherein the network node is a first positioning node of a first PLMN and the selected positioning node is a second positioning node of a second PLMN, and
   wherein the positioning message sent from the first positioning node to the second positioning node further comprises any one or more of at least one parameter describing configuration of one or more signals and/or channels used for positioning measurements, information on one or more measuring nodes, assistance data for positioning measurements, positioning request, positioning measurement request, positioning response, positioning measurements, positioning node's capability and/or availability, identity of LCS target device, characteristics of signals transmitted by the LCS target device, PLMN ID of the first positioning node, PLMN ID of the second positioning node, and PLMN ID of the LCS target device.

9. The method of claim 8,
   wherein the parameters describing the configuration of signals and/or channels used for positioning measurements include any one or more of SRS information, PRS/SRS information, source, and usage,
   wherein the measuring node information include any one or more of a list of measuring nodes associated with the first positioning node, measuring node's identity, PLMN ID, measuring node's capability, measuring node's availability for performing measurements, measuring node's configuration, measuring node's sharing capability, measuring node's sharing capacity, and measuring node's sharing configuration,
   wherein the assistance data includes configuration information of signals and/or channels for measurements by the measuring node for UL positioning,
   wherein the positioning request or the positioning measurement request comprise one or more of a source and usage,
   wherein the positioning response includes one or more of a source and usage, and
   wherein the positioning node's capability and/or availability information includes one or more of ability to support a positioning method, interface to the measuring nodes, and/or communication protocols.

10. The method of claim 8, wherein the first and the second positioning nodes are selected to fulfill the same positioning-related request.

11. A non-transitory computer readable medium which includes therein programming instructions executable by a computing device of a network node to perform the method of claim 1.

12. A network node structured to jointly select a positioning node and a Public Land Mobile Network, PLMN, the network node comprising:
    a communicator structured to receive a positioning-related request from a requesting node or an application;
    a network selector structured to select a PLMN in response to the positioning-related request; and
    a positioning node selector structured to select a positioning node of the selected PLMN in response to the positioning-related request,
    wherein the communicator is also structured to:
    send a positioning message to the selected positioning node, wherein the positioning message indicates to the selected positioning node that it is the only positioning node chosen for fulfilling the positioning-related request, and
    receive a positioning response message from the selected positioning node,
    wherein the positioning-related request includes any combination of a location request and a positioning data request,
    wherein the location request is a request for a location of a Location Service, LCS, target, and
    wherein the positioning data request is a request for data that may be used to determine the location of the LCS target.

13. The network node of claim 12, wherein the positioning node selector and the network selector are structured to select the PLMN and the positioning node based on any combination of:
    positioning Quality of Service, QoS, information included in the location request, LCS target velocity, LCS client type, service type, location request, measurement request, peer positioning node's capability, peer positioning node's availability, peer positioning node's load, positioning method, historical data, collected statistics, availability of a sufficient number of Location Measurement Units, LMUs, in a candidate PLMN in a requested tracking area or location area or geographical area, PLMN priority for positioning, and positioning node priority.

14. The network node of claim 12, wherein the positioning message sent to the selected positioning node includes any one or more of a positioning request, a measurement request, a message with positioning-related information, a message with positioning-related instruction, and information of other selected positioning nodes.

15. The network node of claim 12, wherein the positioning node selector and the network selector are structured to select a plurality of positioning nodes to fulfill the positioning-related request.

16. The network node of claim 15, wherein the communicator the positioning message is sent to at least one positioning node, and the positioning message identifies one or more other selected positioning nodes and corresponding QoS requirements which are used for fulfilling the same positioning-related request.

17. The network node of claim 12, further comprising:
    a controller structured to determine whether a new selection procedure should be triggered based on the positioning response message received from the selected positioning node,
    wherein the communicator, the positioning node selector, and the network selector at structured to perform the new selector procedure when it is determined that the new selection procedure should be triggered.

18. The network node of claim 17, wherein the controller is structured to determine that the new selection procedure is triggered when the positioning response message indicates one or more of:
    the selection decision is not accepted,
    the selection decision has a low priority,
    the selection decision is not a first priority, and
    the selection decision has a priority below a threshold priority.

19. The network node of claim 12,
    wherein the network node is a first positioning node of a first PLMN and the selected positioning node is a second positioning node of a second PLMN, and
    wherein the positioning message sent from the first positioning node) to the second positioning node further comprises any one or more of at least one parameter describing configuration of one or more signals and/or channels used for positioning measurements, information on one or more measuring nodes, assistance data for positioning measurements, positioning request, positioning measurement request, positioning response, positioning measurements, positioning node's capability and/or availability, identity of LCS target device, characteristics of signals transmitted by the LCS target device, PLMN ID of the first positioning node, PLMN ID of the second positioning node, and PLMN ID of the LCS target device.

20. The network node of claim 19,
    wherein the parameters describing the configuration of signals and/or channels used for positioning measurements include any one or more of SRS information, PRS/SRS information, source, and usage,
    wherein the measuring node information include any one or more of a list of measuring nodes associated with the first positioning node, measuring node's identity, PLMN ID, measuring node's capability, measuring node's availability for performing measurements, measuring node's configuration, measuring node's sharing capability, measuring node's sharing capacity, and measuring node's sharing configuration,
    wherein the assistance data includes configuration information of signals and/or channels for measurements by the measuring node for UL positioning,
    wherein the positioning request or the positioning measurement request comprise one or more of a source and usage,
    wherein the positioning response includes one or more of a source and usage, and
    wherein the positioning node's capability and/or availability information includes one or more of ability to support a positioning method, interface to the measuring nodes, and/or communication protocols.

21. The network node of claim 19, wherein the first and the second positioning nodes are selected to fulfill the same positioning-related request.

* * * * *